(12) United States Patent
Matsumitsu et al.

(10) Patent No.: US 7,809,831 B2
(45) Date of Patent: Oct. 5, 2010

(54) METHOD FOR PROVISIONING RESOURCES

(75) Inventors: Ken Matsumitsu, Kanagawa-ken (JP); Takayuki Kushida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 12/058,920

(22) Filed: Mar. 31, 2008

(65) Prior Publication Data

US 2008/0183544 A1  Jul. 31, 2008

Related U.S. Application Data

(63) Continuation of application No. 11/557,577, filed on Nov. 8, 2006, now abandoned.

(30) Foreign Application Priority Data

Nov. 10, 2005 (JP) ............................. 2005-326047

(51) Int. Cl.
*G06F 15/173* (2006.01)
(52) U.S. Cl. ...................................... 709/226; 709/229
(58) Field of Classification Search .................. 709/226, 709/229
See application file for complete search history.

(56) References Cited

U.S. PATENT DOCUMENTS 7,581,008 B2 * 8/2009 Zhang et al. ................. 709/226
2003/0126202 A1 * 7/2003 Watt ............................. 709/203
2005/0102398 A1 * 5/2005 Zhang et al. ................. 709/225
2005/0268063 A1 * 12/2005 Diao et al. .................... 711/170
2005/0289499 A1 * 12/2005 Ogawa et al. ................. 716/18
2006/0159014 A1 * 7/2006 Breiter et al. ................ 370/229
2006/0179383 A1 * 8/2006 Blass et al. .................. 714/738

FOREIGN PATENT DOCUMENTS

JP     11-308302     11/1999

* cited by examiner

*Primary Examiner*—Hassan Phillips
*Assistant Examiner*—Natisha Cox
(74) *Attorney, Agent, or Firm*—Gibb I.P. Law Firm, LLC

(57) ABSTRACT

A provisioning method for allocating a plurality of resources required by a plurality of services, including staging, so as to provide at least one stage, as an intermediate state, in the process of provisioning, in a resource pool shared by the plurality of services. A state of at least one of the plurality of resources is allocated to at least one of the stages as an initial state provided in advance. A predetermined cost is calculated by using a predetermined algorithm based on a setting operation time required for causing a state of each of the allocated plurality of resources to transition to another stage, and optimally allocating all the plurality of resources to the respective stages in order to minimize the predetermined cost.

14 Claims, 21 Drawing Sheets

(g) SERVER IS RETUNED TO POOL FROM SERVICE A (h) OPTIMUM SERVER ALLOCATION IS CALCULATED SINCE SEVER IS ADDED (i) SERVERS ARE CAUSED TO TRANSITION TO REALIZE OPTIMUM SERVER ALLOCATION $C(S1\text{-}1) = C1 + Min(C(S1\text{-}1\text{-}1), C(S1\text{-}1\text{-}2))$ $C(S1) = Min(C(S1\text{-}1), C(S1\text{-}2a))$ $C(S1\text{-}2) = Min(C(S1\text{-}2\text{-}1), C(S1\text{-}2\text{-}2), C(S1\text{-}2\text{-}3))$

RESOURCE REQUEST

COMPLETION OF TRANSITION

STATE DURING TRANSITION

Sx: SERVER ALLOCATION PATTERN
C(Sx): COST IN SERVER ALLOCATION PATTERN Sx

"S1" = "S1-1"
"S1-2" = "S1-2-1"

EX.) COST C(S, X) WHEN
S(0, 1, 0, 0) AND X(1, 0)

|  | GENERATION PROBABILITY |  | ALL RESOURCE ALLOCATION PATTERNS | | | |
|---|---|---|---|---|---|---|
|  |  |  | S(1,0,0,0) | S(0,1,0,0) | S(0,0,1,0) | S(0,0,0,1) |
| X(1,0) | ½ | x | 70 | 10 | 0 | 70 |
| X(0,1) | ½ | x | 80 | 20 | 80 | 0 |
| Sum | (EXPECTED VALUE) |  | 150/2 | 30/2 | 80/2 | 70/2 |
| MIN | = 30/2 | S(0,1,0,0) | | | | |

ALL REQUEST GENERATION PATTERNS (c) SERVICE A IS REMARKED (d) NODES ARE SORTED IN ASCENDING ORDER OF DISTANCES TO SERVICE A (e) EXPECTED VALUE E(A) IS CALCULATED $$E(A) = \omega_A \times$$
$$(0 \times (p_A(1) + p_A(2) + p_A(3))$$
$$+ 10 \times (p_A(4))$$
$$+ 70 \times (p_A(5) + p_A(6) + p_A(7) + p_A(8))$$
$$+ 70 \times (p_A(9) + p_A(10)))$$

(f) E += E(A) IS CALCULATED, AND REMARKED SERVICE IS CHANGED (REMARKED SERVICE = SERVICE B). RETUNE TO FIG. 24C (g) RESOURCE ALLOCATION IS CHANGED. RETURN TO FIG. 23B, AND EXPECTED VALUE E IS CALCULATED

METHOD FOR PROVISIONING RESOURCES

CROSS REFERENCE TO RELATED APPLICATION

This application is a Continuation of U.S. application Ser. No. 11/557,577 filed Nov. 8, 2006, the complete disclosure of which, in its entirety, is herein incorporated by reference.

FIELD OF THE INVENTION

The present invention relates to a method for provisioning resources. More specifically, the present invention relates to a method, system and control program for provisioning resources in an IT environment.

BACKGROUND OF THE INVENTION

In a present IT environment, in particular, in a place such as a data center in which resources are concentrated at one place, a mechanism (provisioning) for efficiently (in terms of processing time and resource utilization rate) allocating an excess resource (a server, a network apparatus, a storage, or the like) to each of services in response to load fluctuations of the services is required. In order to allocate this excess resource to the service, a hardware configuration, OS/application installation, and setting operations, which are suitable for the service, are required. However, setting processes (installing OS/application, switching VLAN (Virtual LAN), and the like) which occur in the process of the operation are relatively time-demanding work in general.

With this being the situation, as a method of carrying out prompt provisioning, a method (Patent Document 1) for uploading data by backing up provisioning data for a network apparatus has been already invented. Additionally, "clone installation" has been disclosed (for example, non-patent documents 1 and 2). In the "clone installation", a disk image of a sever into which a predetermined OS or application is installed is stored in advance, and the disk image is copied at the time of provisioning.

[Patent Document 1] Japanese Patent Application Publication No. Hei 11-308302]

[Non-patent Document 1]
http://www.symantec.com/region/jp/products/ghost_enterprise/index.html

[Non-patent Document 2]
http://www.symantec.com/content/product.cfm?productid=9

DETAILED DESCRIPTION

In a present IT system of a data center and an intra-company, IT resources are secured separately for each of services (customers in the case of the data center, and businesses in the case of the intra-corporation IT system), and in each of the IT resources, a system is constructed and operated independently. Furthermore, for each of the services, the IT resources enough to withstand a load during a peak time are provided in advance. Therefore, a capacity utilization rate of the IT resources except during the peak time becomes low in general. According to a research by a US research company, it is reported that about 75% of CPU powers of servers are not being utilized all over the world. On the other hand, when peak times respectively of services operating by using IT resources are surveyed, it is found that rarely the peak times of the respective services completely coincide with one another, and that the peak times thereof are dispersed in most cases. Accordingly, even when a load more than expected occurs in one service, effective utilization of resources can be realized by utilizing resources allocated to other services. However, it is difficult to realize the above in present systems, since the systems have not been configured with assuming the above-mentioned utilization of the resources.

Against a background as described above, a demand for a system such as an on-demand computing system or a utility computing system has been emerging. This is a mechanism in which various services are integrally managed in a manner that: excess IT resources independently owned by the respective services are reserved in a resource pool shared by all of the services; and at the time of a sudden increase in a load of a resource used by a service, a resource is dynamically allocated to the service from this resource pool. This allocation of the resource to the service from the resource pool is called provisioning. At the time of provisioning, it is necessary to change the settings of the resource, which is to be allocated, to the settings required by the service before starting to utilize the resource.

Figure 1:
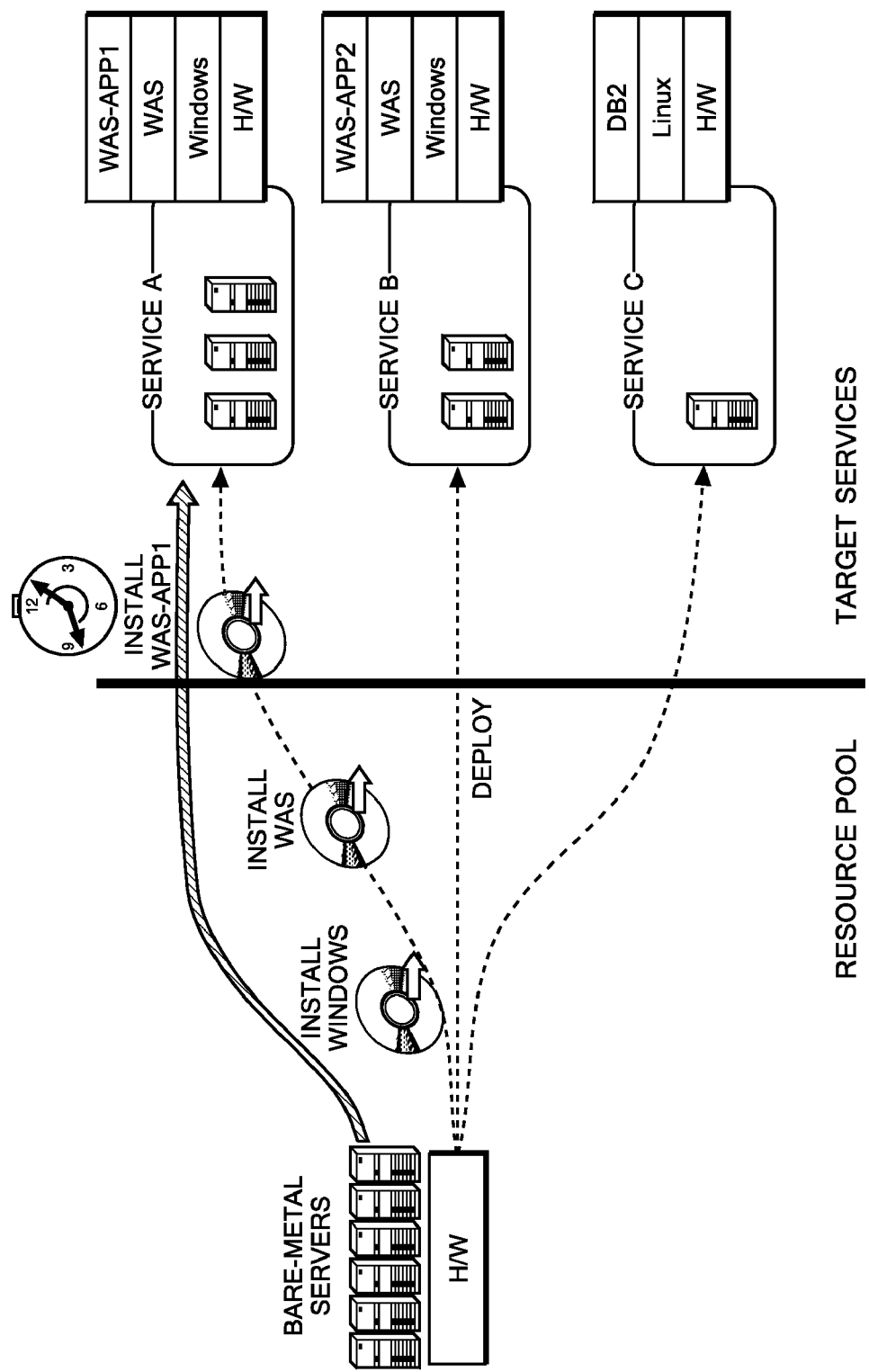
FIG. 1 is a diagram showing a conventional provisioning procedure.

FIG. 1 shows a procedure of an example of a conventional provisioning system. Although a server is shown as an example of a resource in the drawing herein, kinds of resource include a network apparatus, a storage, other hardware, and the like.

FIG. 1 shows a procedure in which pieces of software necessary for services are sequentially installed starting from so-called bare-metal servers where no pieces of software have been installed. That is, with respect to a service A, servers applicable to the service A are constructed in a manner that: first of all, Windows (registered trademark) is installed as an OS; WAS (Websphere (registered trademark) Application Server) is subsequently installed as middleware; and additionally, WAS-APP1 is installed as an application operating on the WAS. With respect to a service B, the procedure until Windows (registered trademark) and WAS are installed in hardware (H/W) is common to that of the service A, but the procedure for WAS-APP2 is different. With respect to a service C, an OS is Linux (registered trademark), and instead of WAS, DB2 (registered trademark) is installed as an application. Therefore, the procedure except that for H/W is different from those of the services A and B. FIG. 1 shows the procedure in which the various pieces of software are sequentially installed in accordance with configurations and the number of servers, which are required by the respective services, and in which three servers, two servers, and one server is deployed (allocated) for each of the service A, the service B, and the service C.

However, in such a simple provisioning system as described above, only after a request for provisioning for a particular service arises, various setting operations are carried out for a resource in a resource pool. Then, after all of the setting operations are completed, the resource is deployed as a service. It takes a long time to carry out the setting operations themselves, and the service is kept suspended until the resource is deployed after the request is generated. In the case of such a simple system, it is difficult to respond to an abruptly increasing fluctuation in load in terms of time. Particularly in the case of provisioning of servers, an OS/application needed by a service have to be sequentially installed in the servers, and thereby it takes a vast amount of time to install the OS/application.

The method in Patent Document 1 where backup data are used, and the clone installation in Non-patent Document 1 are techniques for shortening such setting operations. However, in both of the methods, it is necessary to previously have information associated with H/W, such as a device driver, contained in backup data, or in an original disk image. For example, in the clone installation, a disk image can be installed only in a server of the completely same type as that of a server from which the disk image is extracted. Moreover, since pieces of information, such as a host name and an IP address, which are specific to each of the servers, are left in the disk image, it is necessary to appropriately change settings after the clone installation. These pieces of information are sometimes retained respectively by an OS and applications, and it is difficult to appropriately set up all of information items. Additionally, the number of necessary disk images corresponds to the number of kinds of services which are to be destinations of provisioning. Thus, there is a drawback that it is impossible to make a flexible configuration change, such as, newly applying a patch, or having plural levels of patches. That is, in the provisioning methods such as uploading of backup data and cloning of a disk image, it is necessary to previously prepare the backup data and the disk image respectively, and hence, it is difficult to perform provisioning of resources in a short time in response to plural different requests to the resources.

Accordingly, in order to solve the abovementioned problems, an object of the present invention is to a provide a method, a system and a controlling program thereof, which more flexibly shorten a time required for provisioning in response to plural different requests.

In a first aspect of the present invention, provided is a method for provisioning resources required by a plurality of services, the method for provisioning including the steps of: staging so as to provide at least one stage, as an intermediate state, in the process of provisioning, in a resource pool shared by the plurality of services; allocating a state of at least one resource to at least one stage, as an initial state provided in advance; and calculating a predetermined cost by using a predetermined algorithm based on a setting operation time required for causing a state of the allocated resources to transition to another stage, and optimally allocating all of the resources to the respective stages in order to minimize the predetermined cost.

In a second aspect of the present invention, provided is a staging engine for provisioning resources required by a plurality of services, the staging engine including: a graphing unit for providing at least one stage in a resource pool shared by the services, as an intermediate state in the process of provisioning, and for generating a graph having each of the stages as a node and a transition between the nodes as an edge; a transition planning unit for finding an optimum allocation of states of all of resources in the resource pool in order to minimize a predetermined cost found by a predetermined algorithm; a transition request issuing unit for issuing a resource transition process request based on a transition plan issued by the transition planning unit; an event processor for waiting for an event from an outside; and a deploying unit for finding a node nearest to a service generating a request, if the event is the request from the service.

In a third aspect of the present invention, provided is a computer program for causing a computer to execute provisioning for allocating resources required by a plurality of services, the computer program including the functions of: staging so as to provide at least one stage, as an intermediate state, in the process of provisioning, in a resource pool shared by the services; allocating a state of at least one resource to at least one stage as an initial state provided in advance; and calculating a predetermined cost by using a predetermined algorithm based on a setting operation time required for causing a state of the allocated resources to transition to another stage, and optimally allocating all of the resources to the respective stages in order to minimize the predetermined cost.

In the abovementioned invention, devising a resource pool in order to manage an excess resource shared by the certain number of services, a plurality of intermediate states (stages) are set up in a virtual manner in the process of provisioning to the respective services from the resource pool. It is possible to shorten a time required, from a reception of a resource request to a service from an outside, to a completion of the provisioning, by efficiently allocating in advance a plurality of resources to the intermediate stages in the process of the provisioning, instead of starting setting operations necessary for the provisioning from the beginning after the resource request to the service from the outside is generated. For example, assuming that servers are the resources, a time required until completion of provisioning can be shortened by having an OS previously installed in the servers, and then dynamically installing a plurality of applications operating on the OS in response to the request.

By using the method of the present invention, the number of resources allocated in a resource pool can be reduced relatively by sharing the resource pool among the plurality of services as compared with the conventional case where a resource pool is retained for each of clusters which are units in allocating resources. On the other hand, by using the method of the present invention, a resource can be provisioned from an optimum stage when a request for the provisioning of a resource is generated, whereby a time required for completing the provisioning can be shortened as compared with a conventional case where a resource pool is shared by clusters. Hereinbelow, an embodiment of the present invention will be described with reference to the drawings.

In a preferred embodiment of the present invention, procedures starting from initial states of each resource, and ending in deployment thereof for a service are identified, and are expressed in a directed graph having a state of each of the resources in each phase as a node (stage), and having a setting operation as an edge. In some cases, however, even in the case of deployments for different services, the initial state and some of intermediate states are common. In these cases, those common intermediate states are expressed as the same nodes.

For example, servers are assumed as the resources, and installing tasks of an OS or an application are assumed as setting operations. A state of being a bare-metal server (H/W), in which an OS is not yet installed, corresponds to an initial node; a state where only an OS is installed in a server corresponds to an intermediate node 1; a state where middleware and the like are installed in a server corresponds to an intermediate node 2; and a state where an application necessary for a service is installed in a server corresponds to a final node. Additionally, there are other various intermediate states such as: a state where no middleware exists; a state where a large number of applications are installed; and a state where the same application are installed with different settings.

Here, since it is possible to apparently cause transitions between the initial node and the intermediate node 1, between the intermediate node 1 and the intermediate node 2, and between the intermediate node 2 and the final node, directed edges are drawn therebetween. Additionally, in the case where another service utilizes the same OS, the intermediate node 1 is to be shared by the service and the forgoing services. Furthermore, since it is possible to go back to and restart the procedure for installation of the OS, from any one of the nodes, an edge is drawn from each of the nodes to the initial node. Additionally, when a setting operation can be cancelled (for example, when an application can be uninstalled), an edge is drawn in a reverse direction therebetween.

Figure 2:
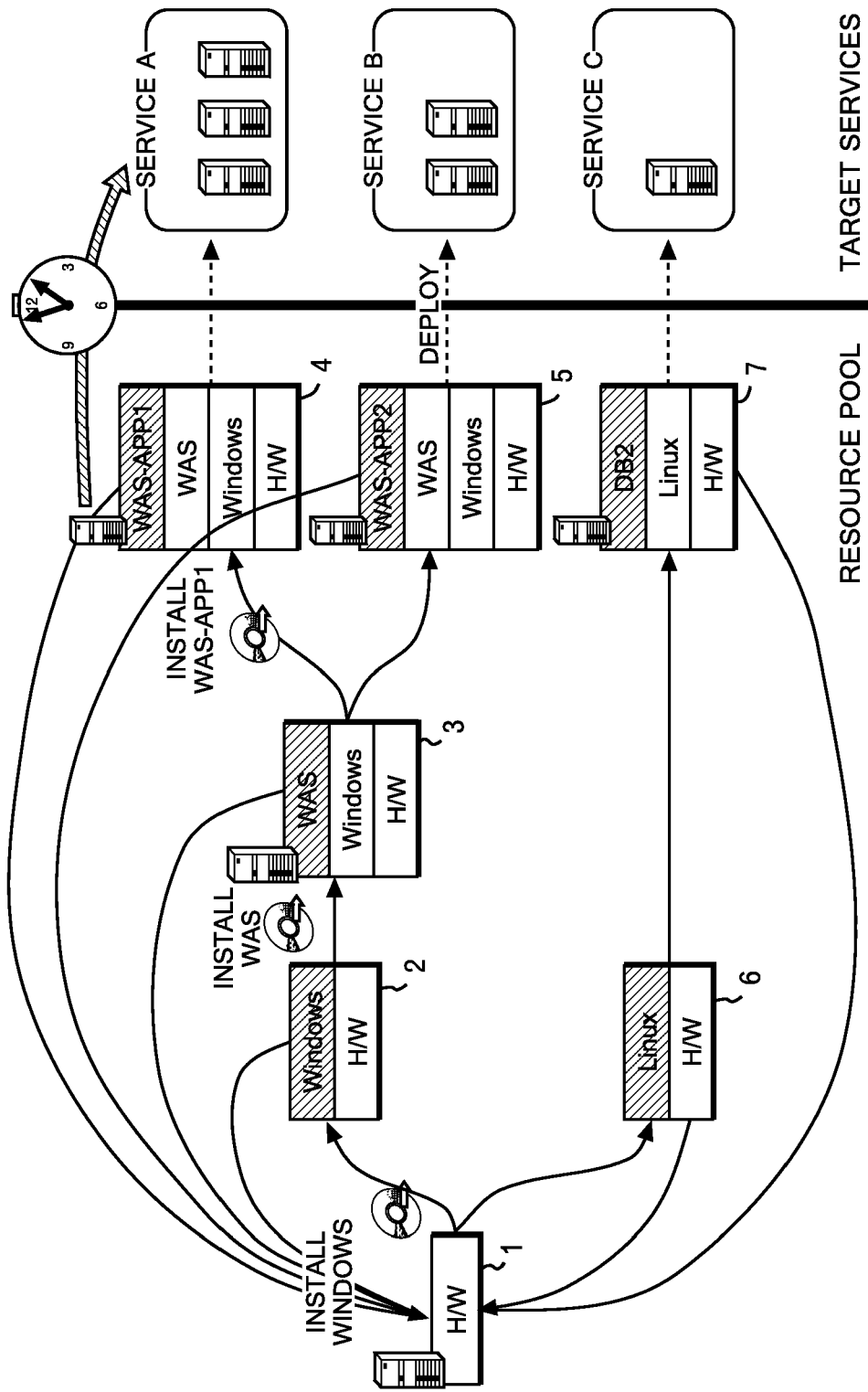
FIG. 2 is a diagram showing an outline of a provisioning system in a preferred embodiment of the present invention.

FIG. 2 shows a directed graph in which the above described initial, intermediate, and final states (stages) are expressed as nodes, and in which the nodes are connected by edges. In other words, the directed graph is configured to have the following nodes: nodes each representing a state in which only an OS is installed in a bare-metal server (H/W) in an initial state 1; a node representing a state in which a middleware is additionally installed therein; and nodes each representing a state in which an application is further installed therein. Here, the directed graph means a graph having directed edges. Additionally, FIG. 2 shows a state in which one sever is allocated to each of an initial node 1, an intermediate node 3, and final nodes 4, 5, and 7. Here, the final node means a state where a server can be deployed, just as it is, for a service. In this case, it is defined that a node which is the "nearest" to the service A is the node 4, and that a node which is the second "nearest" thereto is the node 3. The word "near" does not mean nearness in a spatial distance, but means temporal shortness of a total time for setting up a resource, so as to cause the resource to transition from one node to another.

Each of resources in a resource pool is allocated to any one of the nodes, and can be in a state corresponding to the node (stage) to which the each of the resources is allocated. Additionally, by carrying out a process or a setting operation associated with an edge (processing operation), each of the resources is caused to transition between two nodes along the edge. When a large number of resources are allocated to a node (for example, the nodes 4, 6 and 7 in FIG. 2) close to a state where a service is provided, it is possible to reduce a time required for provisioning for the service. On the other hand, when the resources are allocated to a node (for example, the nodes 1, 2 and 6 in FIG. 2) far from the service, the resources can respond to provisioning for more various services. Accordingly, by causing the present resources to transition to, and to be allocated to, appropriate nodes in consideration of a resource request pattern and an SLA (Service Level Agreement) of each of the services, a time required for provisioning can be reduced.

When a request is generated by a certain service, a resource is provisioned to the service, the resource allocated to the nearest node to a state where the service is provided. After the provisioning, one resource is reduced in the pool. In response to this, an optimum allocation is calculated again, whereby allocation of the resources is changed.

Hereinbelow, an example of a system configuration according to the present invention will be described.

Figure 3:
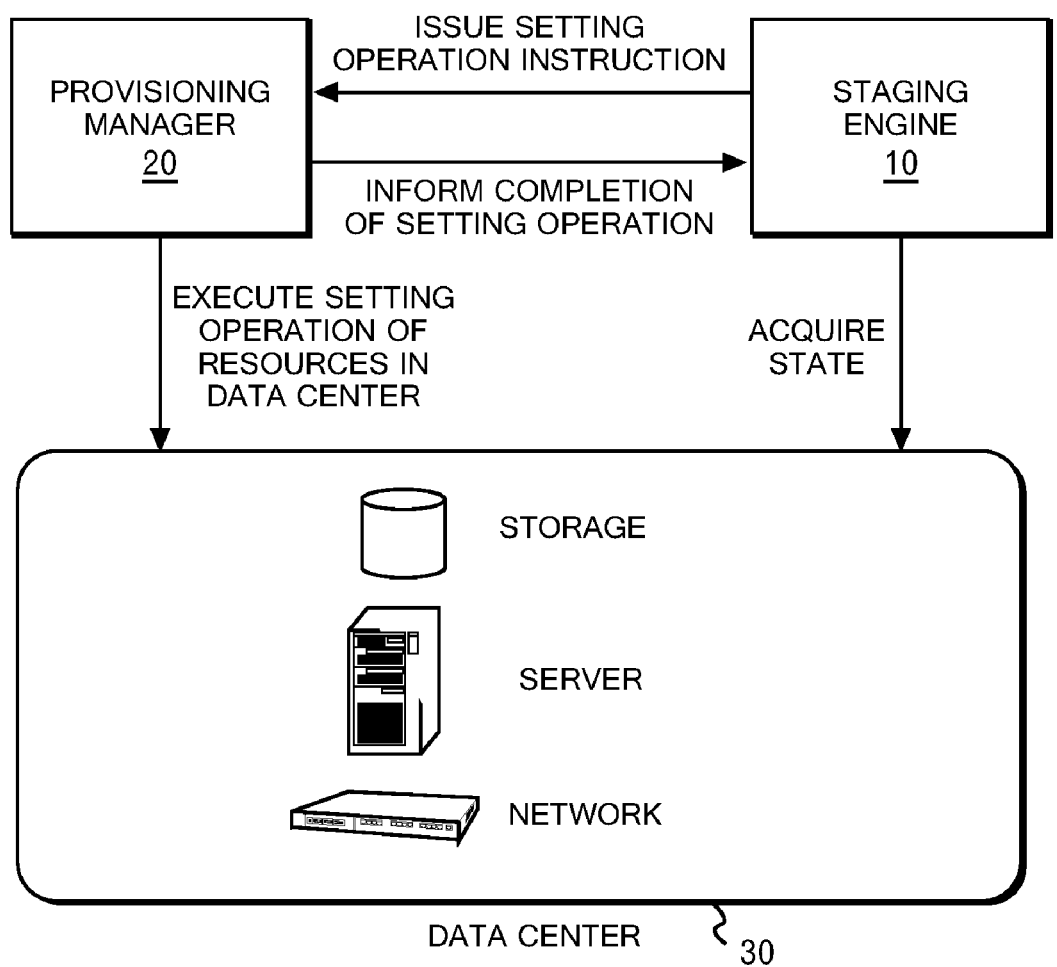
FIG. 3 is an entire configuration diagram of the system of the preferred embodiment of the present invention.

An entire configuration thereof as an embodiment of the present invention is shown in FIG. 3. As shown in FIG. 3, this system is composed of a staging engine 10 for generating the above-described graph, for planning a resource transition, and for issuing a transition process request between nodes, and a provisioning manager 20 for carrying out setting operations on resources in a data center 30 (a resource pool).

Figure 4:
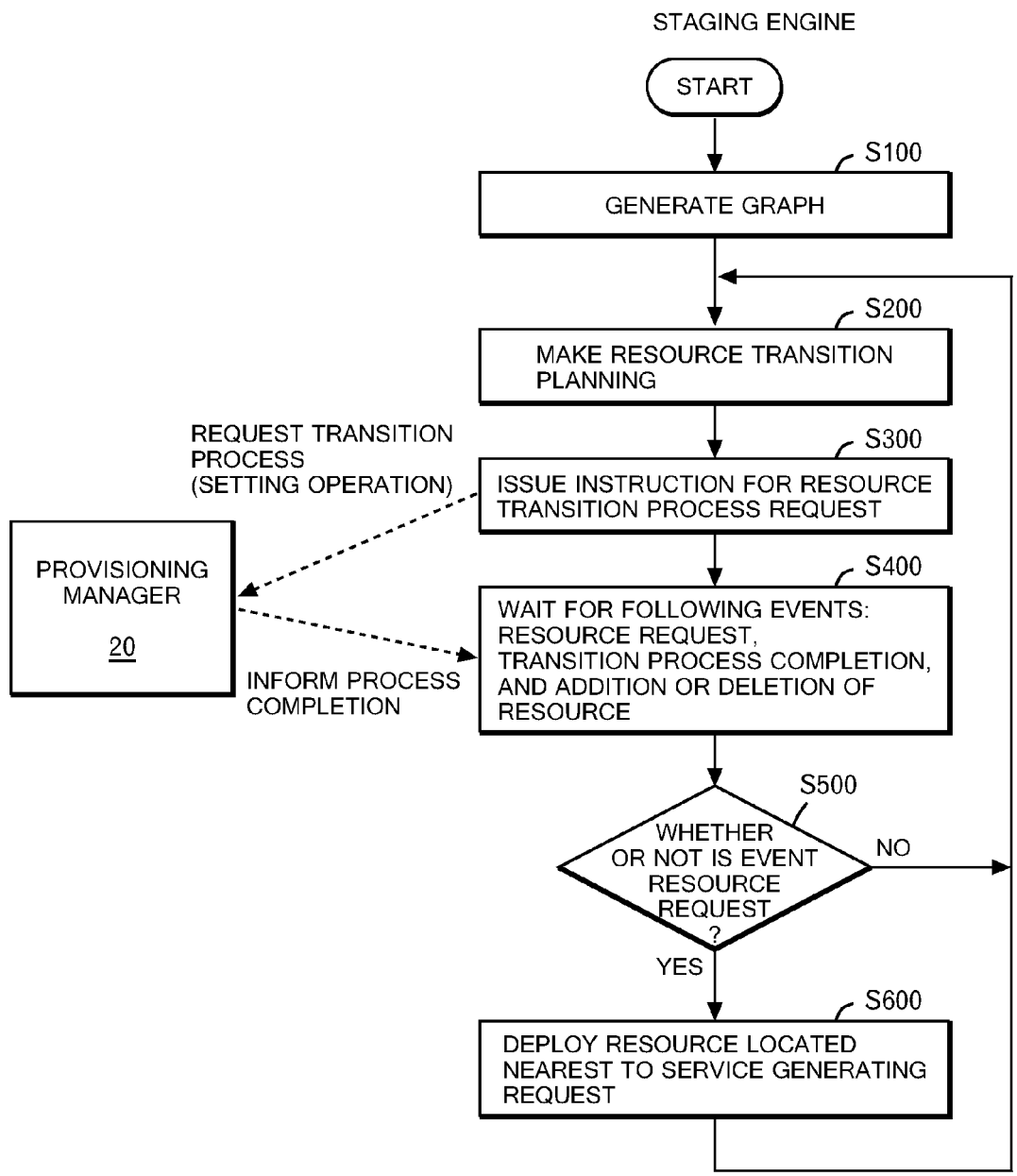
FIG. 4 is a diagram showing a flowchart representing processing steps in a staging engine.

An entire flow of processes in the staging engine 10 is shown in FIG. 4. First of all, a graph is generated in Step S100 (a graphing unit). Specific details of the graph generation will be described later.

After the graph is generated, Step S200 is a step of finding which node (stage) in the graph each of the resources such as a server and the like in the resource pool is caused to transition to (a transition planning unit). A specific algorithm of the transition plan will be described later.

Step S300 is a step of issuing an instruction for a transition process (a setting operation associated with an edge along a transition) of a resource from a current resource allocation, in accordance with the transition plan calculated in Step S200 (a transition request issuing unit). The issued instruction is carried out by the provisioning manager 20 which actually controls setting operations. In Step S300, only issuing the process instruction is carried out, and immediately after the issuing the instruction, the process goes to Step S400. If there is no need to cause any resource to transition, nothing is processed.

Step S400 is a step of waiting for an event from an external unit (the provisioning manager, a service request system, or the like) (an event processor). Here, as kinds of the events, the following three kinds are assumed:

1) Resource request event, which indicates that a request for a resource is generated by a service;

2) Transition process completion event, which indicates that the transition instruction (setting operation) issued to the provisioning manager is completed; and 3) Event of adding or deleting a resource to and from the resource pool, the event indicating a change in the number of resources in the resource pool.

If any one of the above events occurs, the process goes to Step S500.

In Step S500, a kind of the event which occurs is judged to be one of the above three. The process goes to Step S600 in the case of the resource request event, or the process goes back to Step S200 in the other cases.

In Step S600, an instruction is issued to the provisioning manager 20 and the like in order to deploy a resource for the service generating the request, the resource located at a stage which is the nearest (requires the shortest processing time until the completion of deployment) to the service (a deploying unit). The provisioning manager 20 may not actually deploy the resource, but another system may do. In the staging engine 10, the process goes back to Step S200 immediately after issuing the deployment instruction (in Step S600).

Figure 5:
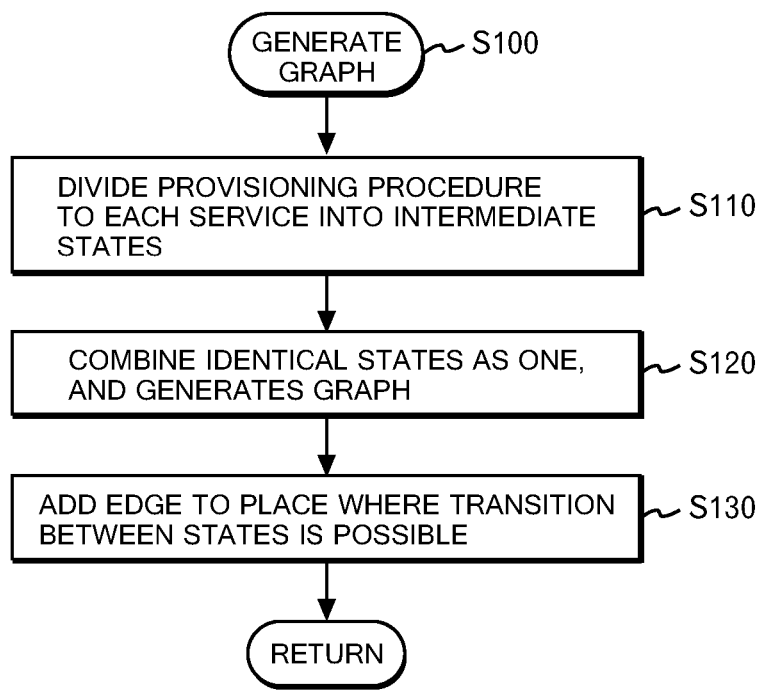
FIG. 5 is a diagram showing a flowchart of graph generation.
Figure 6:
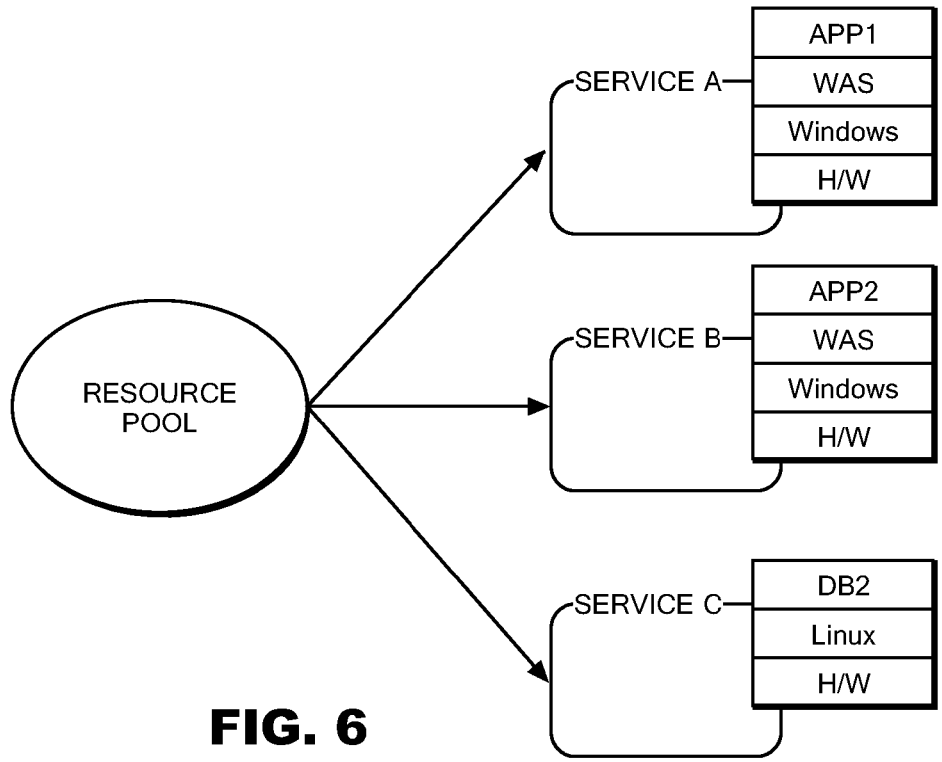
FIG. 6 is a diagram showing an example of services sharing a resource pool.

FIG. 5 shows a process of the graphing unit carried out in Step S100. Additionally, FIG. 6 shows a resource pool and services A, B and C, which utilize the resource pool, as an example for explanation.

Figure 7:
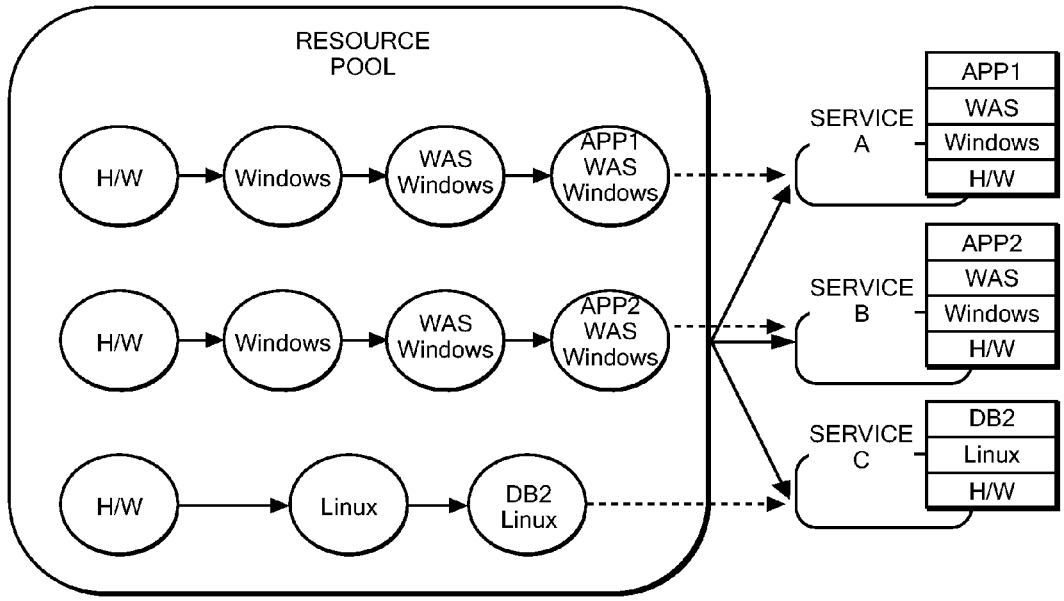
FIG. 7 is a diagram showing an example of Step S110 where a provisioning procedure to each of the services is divided into intermediate states.

First, in Step S110, with respect to the resource pool and the services A, B and C, which utilize the resource pool, a procedure of provisioning for each of the services is divided into intermediate states (stages). A result of the division is shown in FIG. 7.

Figure 8:
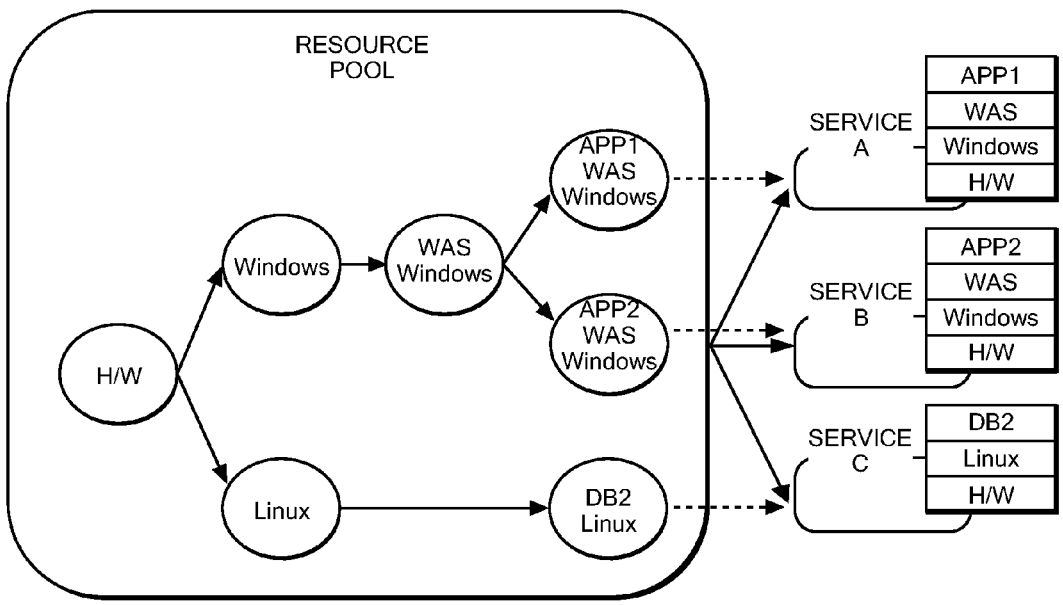
FIG. 8 is a diagram showing an example of Step S120 where a graph is produced by combining the intermediate states which are identical to each other.

Next, in Step S120, the intermediate states which are identical to each other among the divided intermediate states are combined as one to generate a graph as shown in FIG. 8.

Furthermore, in Step S130, an edge in a reverse direction in a case where a setting operation is reversible (a case where cancellation of the setting operation is possible, or a case where there is an operation for returning to one stage before), and an edge to an initial state (it is possible by a deleting operation) in OS/application installation are added.

Figure 9:
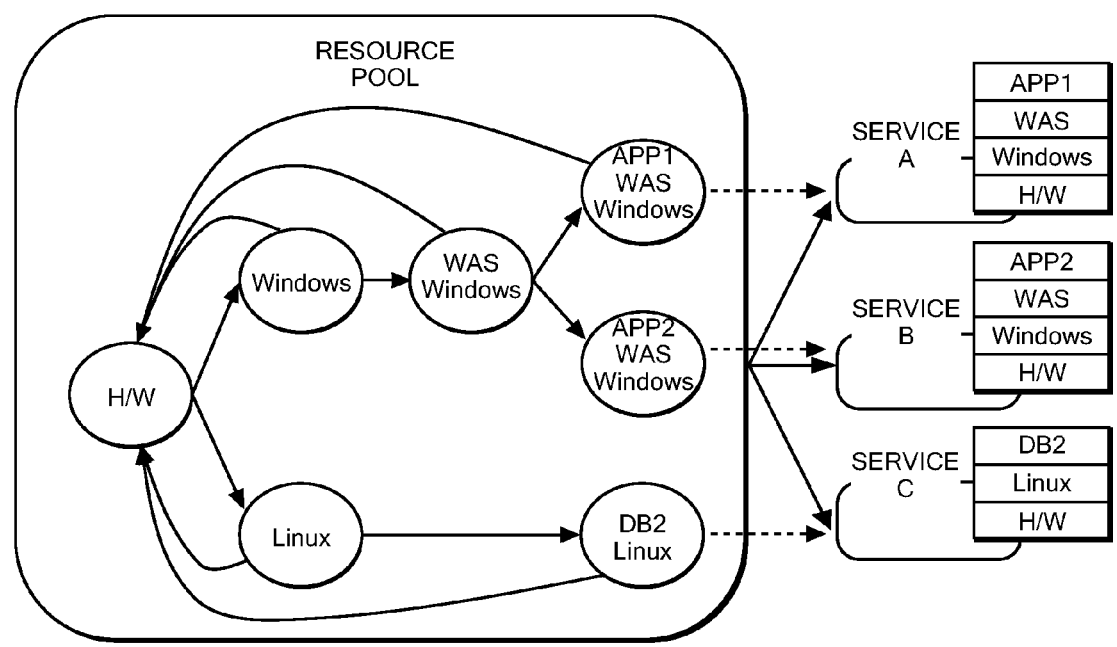
FIG. 9 is a diagram showing an example of Step S130 in which an edge is added to every location between states where a transition in between is possible.

FIG. 9 shows a structure (topology) of a directed graph generated by the aforementioned steps.

Hereinafter, a specific scenario is shown in FIGS. 10 to 14 based on a simple example. These drawings show a procedure in which three servers are caused to sequentially transition to four nodes in response to resource requests generated by the services. Hereinafter, in the drawings, reference numerals of nodes are indicated by circling them. In this example, an initial stage is a node 1, an intermediate stage is a node 2, and final stages are nodes 3 and 4. Additionally, an underlined number situated above each edge (arrow) in the drawings indicates a setting operation time required for causing one server to transition between nodes.

Figure 10:
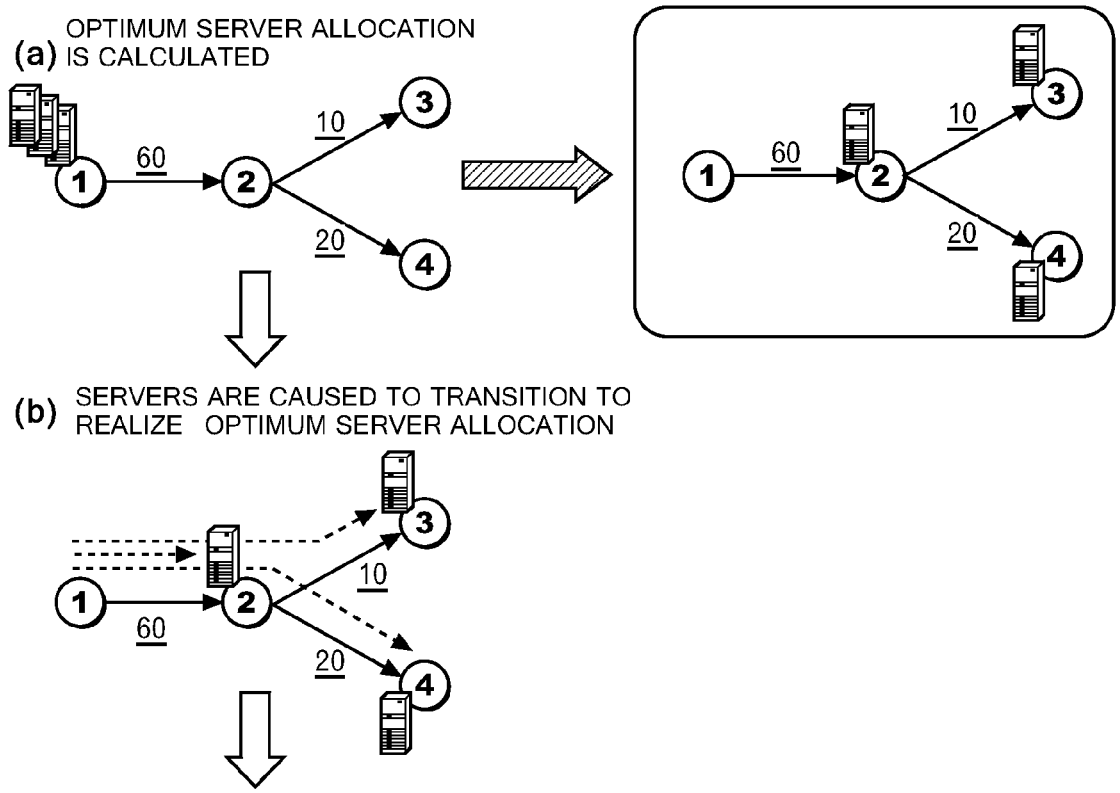
FIG. 10 is a diagram (Part 1) showing a specific example of transitions for a server allocation.

All of the three servers are assumed to be at the node 1 in the initial state. At this point, first of all, a graph such as the above is generated, and an optimum server allocation calculation is performed (FIG. 10). In this example, the optimum allocation is assumed to be a state where one server is allocated to each of the nodes 2 to 4 (an illustration on the right hand side of FIG. 10).

Figure 11:
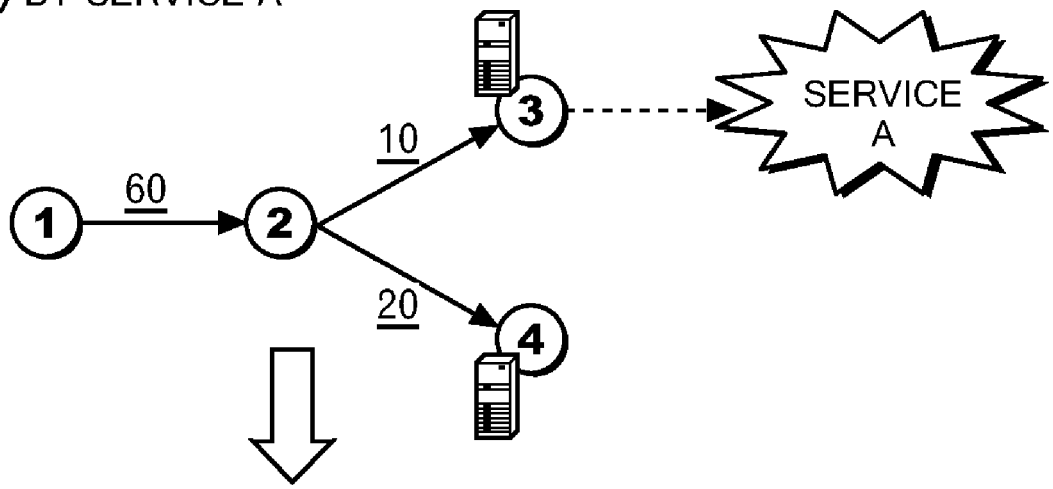
FIG. 11 is a diagram (Part 2) showing the specific example of the transitions for the server allocation.
Figure 11:
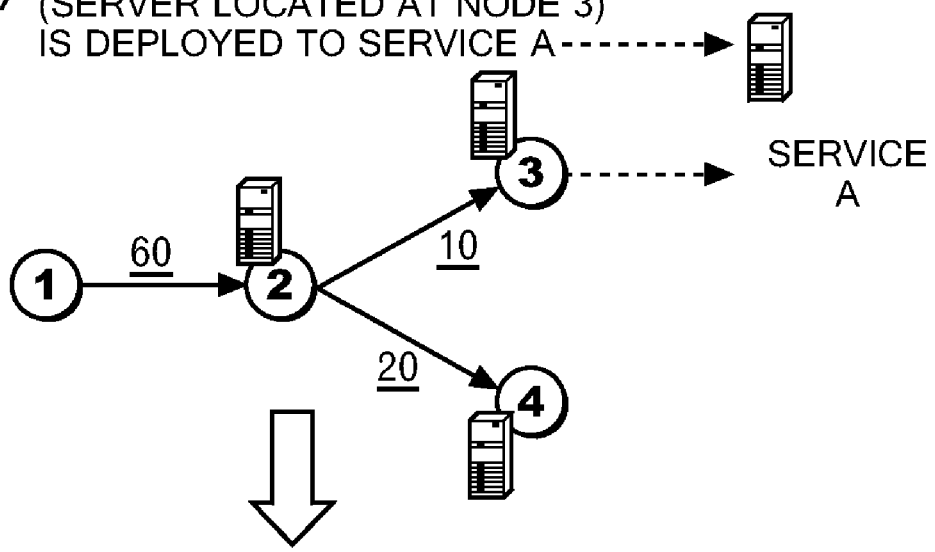
Figure 12:
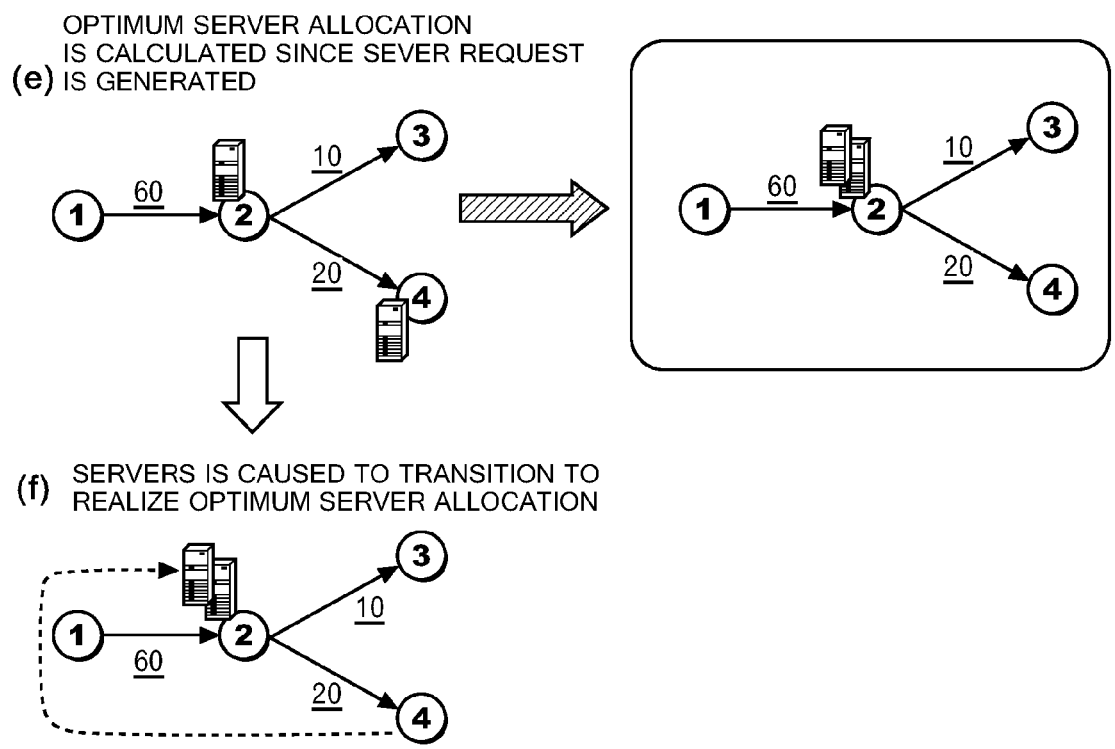
FIG. 12 is a diagram (Part 3) showing the specific example of the transitions for the server allocation.
Figure 13:
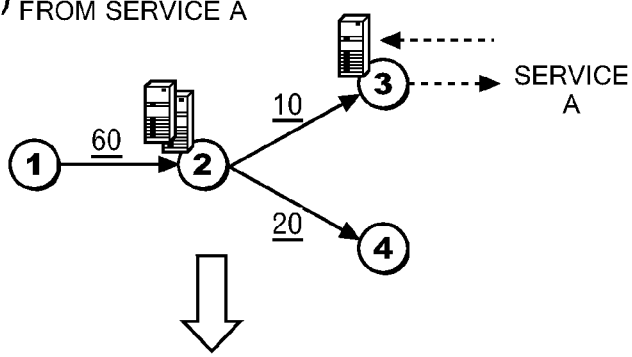
FIG. 13 is a diagram (Part 4) showing the specific example of the transitions for the server allocation.
Figure 13:
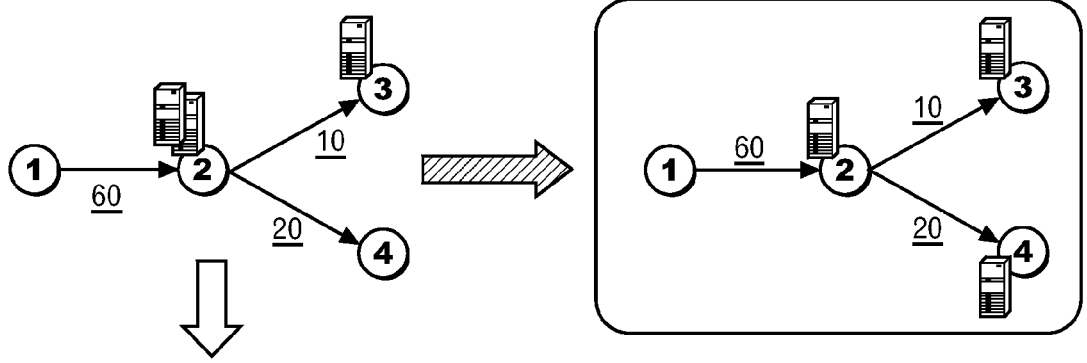
Figure 14:
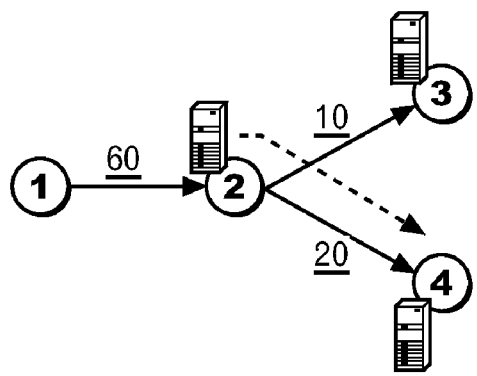
FIG. 14 is a diagram (Part 5) showing the specific example of the transitions for the server allocation.

Subsequently, the servers are caused to transition (move between stages) based on a result of the allocation calculation (FIG. 10). Thereafter, it is assumed that a server request is generated by the service A (FIG. 11). Since an event of the server request is generated, the server nearest to the service A (the server requires the shortest processing time until deployment) is deployed for the service A (FIG. 11). Since the server request is generated and the number of servers in the resource pool is reduced to 2, another server allocation calculation is performed. In accordance with the result of the calculation, the servers are caused to transition (FIG. 12). Thereafter, when one server is returned to the resource pool from the service A (FIG. 13), it is assumed that an event of adding a server to the resource pool occurs. Subsequently, another server allocation calculation is performed (FIG. 13). In accordance with this allocation calculation, all of the servers are caused to transition (move between stages) to an optimum state (FIG. 14).

Figure 15:
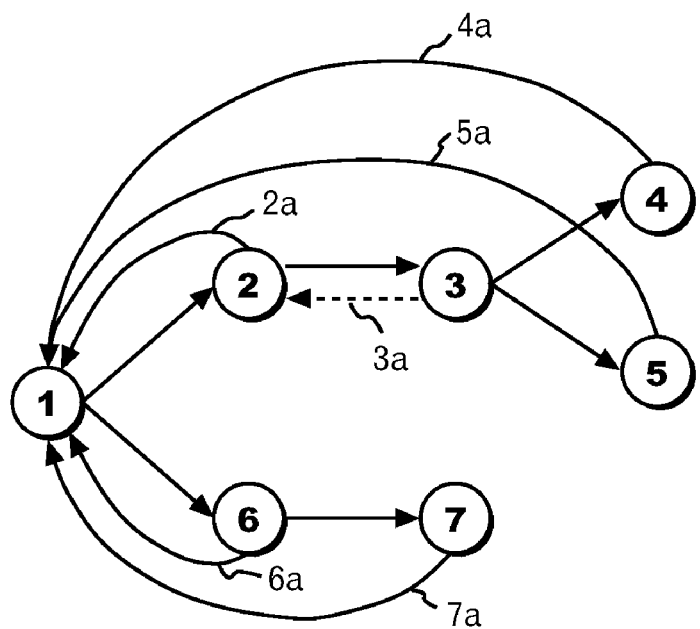
FIG. 15 is a conceptual diagram showing a model of directed graphs.

FIG. 15 shows a model of the graphs. As already described, reference numerals of nodes are indicated by circling them, and nodes between which a transition can be caused are indicated by arrows. Here, it is assumed that, as indicated by arrows 2a to 7a, transitions to an initial node are possible from every node (because settings processed by provisioning are deleted in one process). Additionally, as indicated by the arrow 3a in a dotted line, there is a case where bidirectional transitions are possible between intermediate nodes.

In the resource transition plan (Step S200, or the transition planning unit) in FIG. 4, in order to solve the abovementioned problem of allocating resources to nodes, the problem is generalized and formulated as follows.

Inputs:

A topology of a graph (a structure of a graph)

Weights of edges

A weight of each edge is defined as a time required for a transition between nodes (a time required for a setting operation)

The number of resources currently allocated to each of the nodes

A distribution of generation of a deployment request for each service

A deployment request distribution for n resources is estimated based on track record data of past deployment requests. As a precondition to this estimation, it is assumed that the track record data of the past requests are applicable (on the precondition that the deployment request distribution for n resources are the same as, or coincide within few errors with, the past deployment request distribution, just like, for example, changes from Sunday to Saturday of one week, or changes from 0:00 to 23:00 of a day). Alternatively, the deployment request distribution for n resources may be dynamically estimated in each case by using a prediction technique or the like. (In general, it is assumed that a generation probability can have a different generation probability for each unit time. Additionally, the unit time is set to be at the same level as compared to times for transitions between nodes.)

A penalty for a delay in deployment for a service X The penalty is set up in a manner that, since importance levels are different depending on services in general, a delay for an important service results in a large loss, and a delay for an unimportant service results in a small loss. A value thereof is determined by SLA.

Outputs:

An optimum number of resources allocated to each of the nodes

An Objective Function:

Minimization of a cost due to a delay in deployment.

The cost is determined by a product of a time from generation of a deployment request to completion of the deployment, and a penalty for a service for which the deployment is performed.

Hereinbelow, specific three kinds of algorithm, i.e., Algorithms 1 to 3 will be described. Hereinafter, the following parameters or expressions will be used.

$d(I, j)$ denotes a time required for a transition from node i to node j (a weight of an edge).

$S(n_1, n_2, n_3, \ldots, n_m)$ denotes a state where $n_1$ resources, $n_2$ resources, $n_3$ resources, and $n_m$ resources are allocated to a node 1, to a node 2, to a node 3, and to a node m, respectively.

$X(n_1, n_2, n_3, \ldots, n_x)$ indicates that requests for $n_1$ resources, for $n_2$ resources, and for $n_x$ resources are generated by a service 1, by a service 2, and by a service X, respectively.

$\omega_x$ denotes a penalty for the service X.

Figure 16:
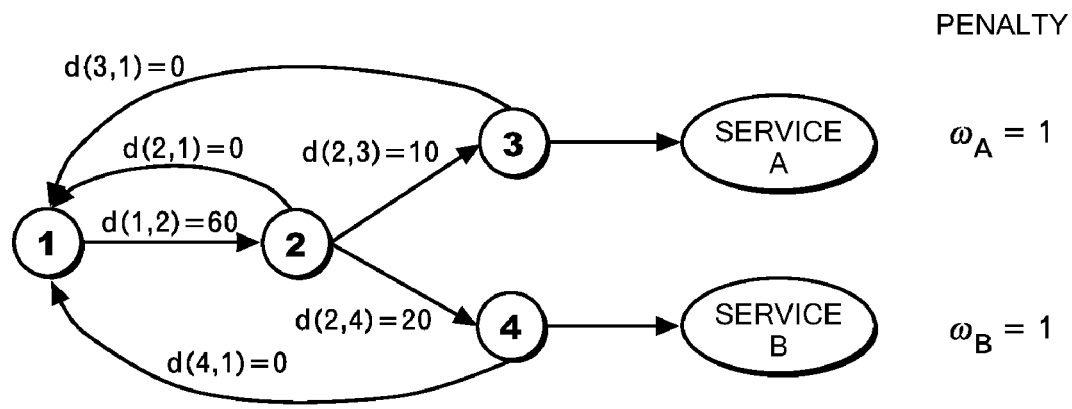
FIG. 16 is a diagram showing specific examples of the distances between nodes.

For example, in an example shown in FIG. 16, the penalties for the service X are expressed as the numbers corresponding to respective edges, that is, $d(1, 2)=60$ for a transition from the node 1 to the node 2, $d(2, 3)=10$ for a transition from the node 2 to the node 2, and $d(i, 1)=0$ for all transitions from the nodes 2 to 4 to the node 1. Additionally, if there is no difference in penalties between the services A and B, it is expressed as $\omega_A=\omega_S=1$.

<Algorithm 1>

In this part, a first algorithm will be described.

Algorithm 1 finds an allocation pattern which is one move or two moves ahead of a current allocation pattern, and which minimizes a cost, by running simulations based on resource request distributions of the respective services.

All possible combinations of resource transitions are considered from a view point of whether or not each of the resources transitions to an adjacent node from the current resource allocation. For example, taking the example in FIG. 16 into account, if the current resource allocation is S(2, 0, 0, 0), and if there is no distinction among the resources, the following three kinds of allocation candidates are obtained:

S(2, 0, 0, 0) for a case where none of the two resources transition;

S(1, 1, 0, 0) for a case where only one resource transitions; and

S(0, 2, 0, 0) for a case where both of the two resources transition.

For each of the allocation candidates, resource requests from the services in a certain time period ($0 \leq t \leq T$) are generated based on random numbers, or based on particular probability distributions. Then, moves at a time of the deployments are simulated, and costs required for the deployments are calculated. If any number of times for running simulations is denoted as N, this calculation is repeated N times. Thereby, a candidate which minimizes a mean of costs among the candidates is set as a next allocation destination, and in order to realize the state thereof, a transition process is carried out.

Specifically, in accordance with an OptimalAllocation function as follows, an optimal allocation is found.

```
OptimalAllocation
Input parameters:
    Current resource allocation (s_cur)
    Current time (t_cur)
Output parameters:
    Cost (c)
    Optimal resource allocation (s_opt)
    (when "c" is a minimal cost)
```

Method:

From the current resource allocation (s_cur), a group (S) consisting of resource allocation candidates which are one move or two moves ahead. "S" includes "s_cur" in which no transitions are caused.

```
foreach (s_next: S) {
    c(s_ext) = 0
    for (count=0; count<N; count++) {
        c(s_next, count) = 0 {
        if (a resource allocation candidate
            (s_next) and the current resource allocation
            (s_cur) are different) {
            start transitions of resources in order to
            realize the resource allocation candidate.
            for (t=t_cur; t<T; t++) {
                by simulations, determine whether a
                request is generated by a service, or not.
                if (a request is generated at the time t)
                {
                    deploy a resource located nearest to
                    a service generating the request;
                    add a cost required for the deployment
                    at this time to c(s_next, count); and
                    define, as "s_removed", a resource
                    allocation after one resource is
                    deployed.
                    if    (next calculation)
                    {//calculation after the next
                    calculate    OptimalAllocation
                    (s_removed, t); and
                    add a cost, which is to be outputted
                    thereby, to c(s_next, count).
                    }
                }
            elseif  (a transition is completed) {
                calculate OptimalAllocation (s_next,
                t); and
                add a cost, which is to be outputted
                thereby, to c(s_next, count).
                }
            }
        }
    }
    (s_next) = (c(s_next, 0)+ . . . + c(s_next, N))/N
}
```

The minimum cost c(s_next) and the resource allocation s_next are set and outputted as c, and s_opt.

Figure 18:
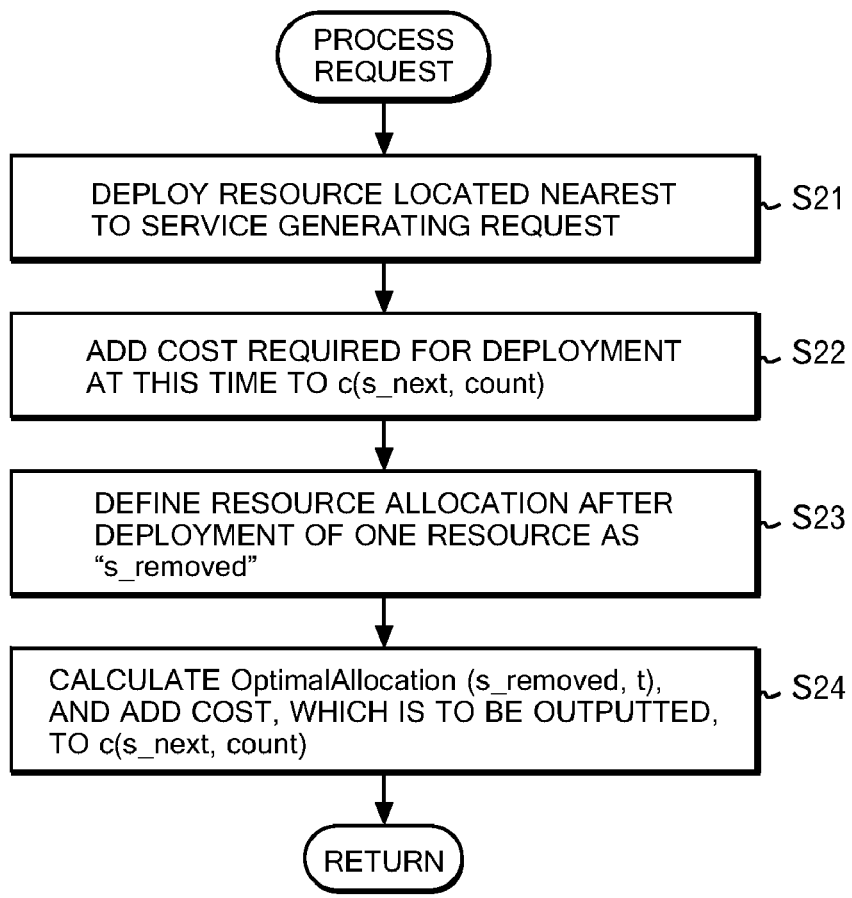
FIG. 18 is a diagram (Part 2) showing the flowchart of Algorithm 1.
Figure 17:
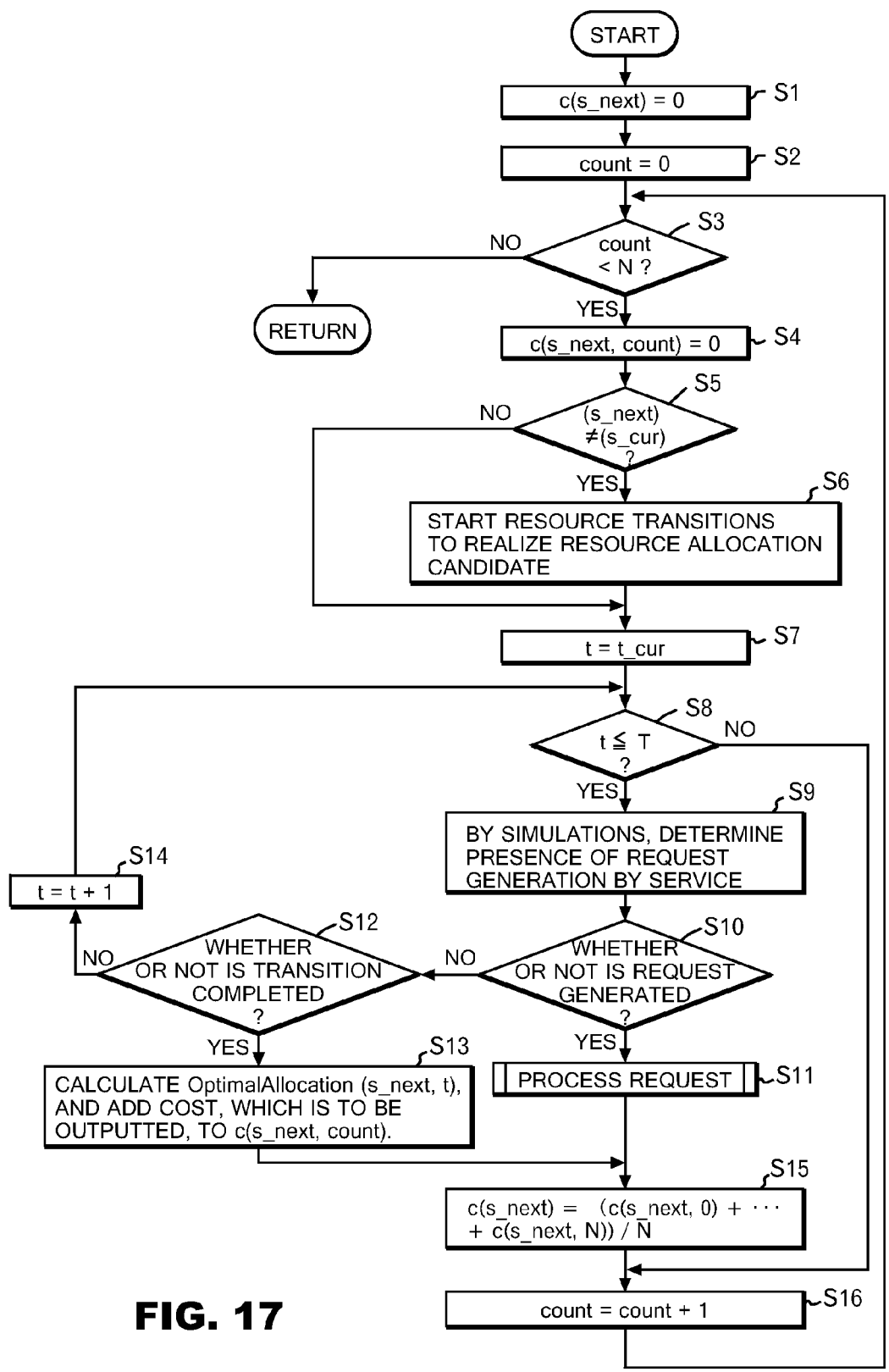
FIG. 17 is a diagram (Part 1) showing a flowchart of Algorithm 1.

Flowcharts in FIGS. 17 and 18 show a process on a certain "s_next" in the abovementioned algorithm (a process within the text staring with the first "for" in the OptimalAllocation).

Figure 19:
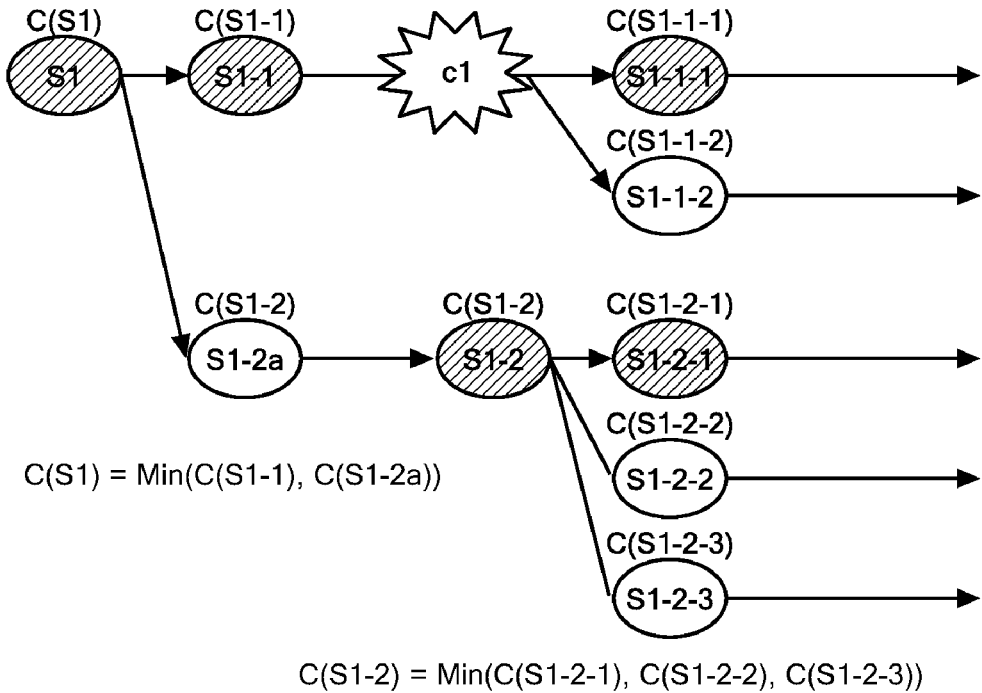
FIG. 19 is a diagram showing a specific example of Algorithm 1.
Figure 19:
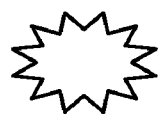
Figure 19:
Figure 19:
Figure 20:
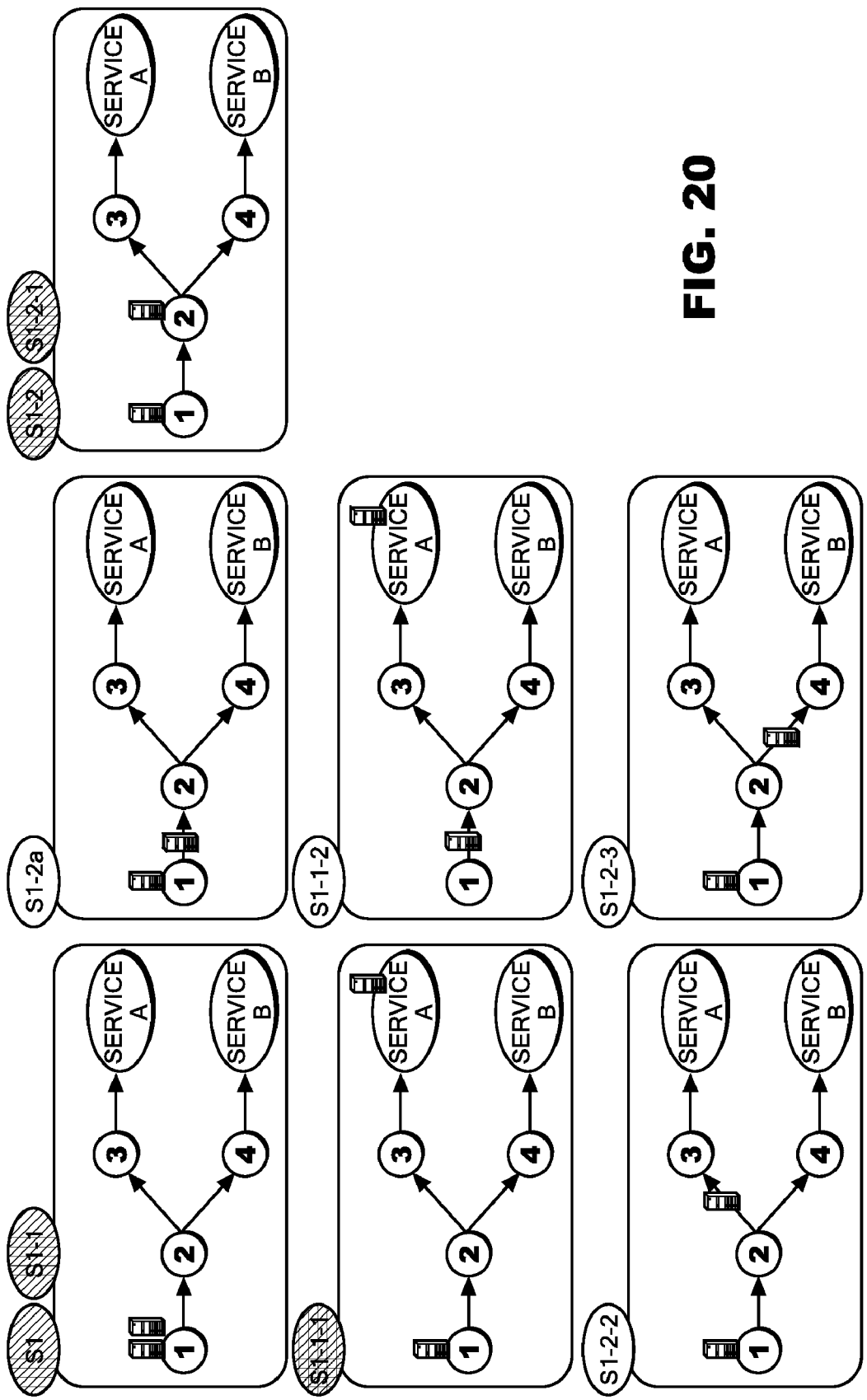
FIG. 20 is a diagram showing states of servers in each of states in FIG. 19.

FIG. 19 shows a simple specific example of the abovementioned algorithm. Additionally, FIG. 20 shows allocations of servers in the respective states in FIG. 19. In FIGS. 19 and 20, a shaded ellipsoid indicates a state where a transition is completed, and an outlined ellipsoid indicates a state during a transition.

First of all, in an initial state S1, two servers are allocated. As states possible to be realized next to the state S1 (the state which is one move ahead), states S1-1 and S1-2a are considered. In the state S1-1, no transitions are caused (that is, S1-1=S1), and in the state S1-2a, one server is on the way of a transition to a node 2. Here, as a cost C(S1) in S1, the smaller of cost between those of S1-1 and S1-2a is adopted. That is, if written in a mathematical expression, this is expressed as C(S1)=Min(C(S1-1), C(S1-2)), where C(S1-2)=C(S1-2a).

Here, suppose that a request for one server is generated by a service in S1-1, one server is deployed for the service in the first place, and subsequently, a consideration is again given to transition candidates for the other server remaining after excluding the deployed server. In this case, as states possible to be realized next to S1-1, there are two kinds which are: a state S1-1-1 (=S1-1) where the remaining server is not caused to transition; and a state S1-1-2 where the remaining server is on the way of a transition from a node 1 to the node 2. Here, when the cost required for the foregoing deployment is denoted as C1, a value obtained by adding, to the cost C1, the smaller of cost between those of S1-1-1 and S1-1-2 is adopted as a cost C(S1-1) in the state S1-1. That is, this is expressed as C(S1-1)=C1+Min(C(S1-1-1), C(S1-2-2)).

On the other hand, upon completion of a transition from S1-2a to S1-2, a consideration is given to succeeding transition candidates. As the succeeding transition candidates, there are possible three kinds which are: S1-2-1 (a state where no transitions are caused, that is, =S1-2); S1-2-2 (a state where one server is on the way of a transition from the node 2 to a node 3); and S1-2-3 (a state where one server is on the way of a transition from the node 2 to a node 4). At this time, as a cost C(S1-2) in S1-2, the smallest of cost among those of S1-2-1, S1-2-2, and S1-1-2 is adopted. That is, this is expressed as C(S1-2)=Min(C(S1-2-1), C(S1-2-2), C(S1-2-3)).

Requests are generated N times by simulation, and the calculations as the above are performed for each of the requests to find a minimum cost and a resource allocation minimizing the cost. This resource allocation is set to be an allocation in the optimal staging.

<Algorithm 2>

In this part, a second algorithm will be described. In Algorithm 2, all of combinations of resource allocations are considered in the following manner. An expected value of each of the combinations is calculated in consideration to all possible provisioning requests, so as to find out a combination of resource allocations minimizing a expected value.

1. for each allocation S={all allocation patterns of resources}
   (1) for each request X={all of generated request patterns within the number of the resources}
       (a) E(S)=0
       (b) A cost c(S, X) in an allocation S for a generated request X is calculated. In a state of the allocation S, the nearest resource to a service generating the request is deployed for the service. A sum product of weights and penalties upon a transition of the resource to the service is set as c(S, X).
   (c) E(S)+=p(X)×c(S, X) is calculated, where p(X) denotes a probability of generation of the request X. That is, E(S) can be found by $$E(S) = \sum_x p(X) \times c(S, X)$$ [Equation 1]

where $$c(S, X) = \sum_{i,j} \omega_x \times d(i, j);$$

p(X) denotes a probability of generation of a request X; $\omega_x$ denotes a penalty for a delay in deployment for a request X; and d(i, j) denotes a time required for a transition from node i, where a resource is currently located, to node j corresponding to the request X.

2. Find an allocation S minimizing an E(S).

3. In order to realize a resource allocation found in 2., determine which and how resources should be caused to transition from a current resource allocation. This determination is made by using an existing solving method of a graph matching problem, the solving method using a method for minimizing a transition cost, and a method for prioritizing a transition for a service of high priority.

Figure 21:
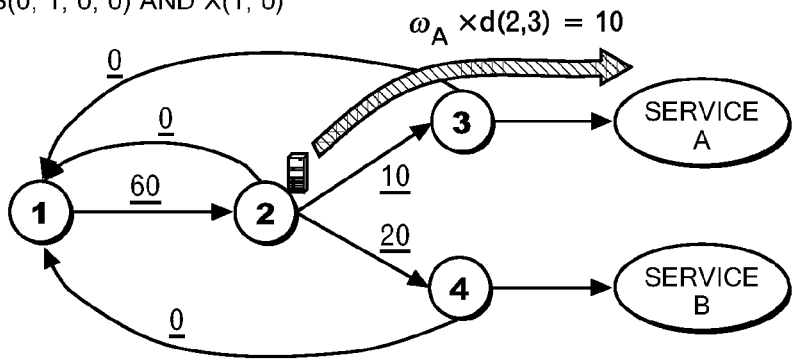
FIG. 21 is a diagram showing an example of calculation of Algorithm 2 in the case where the number of resources is 1.
Figure 22:
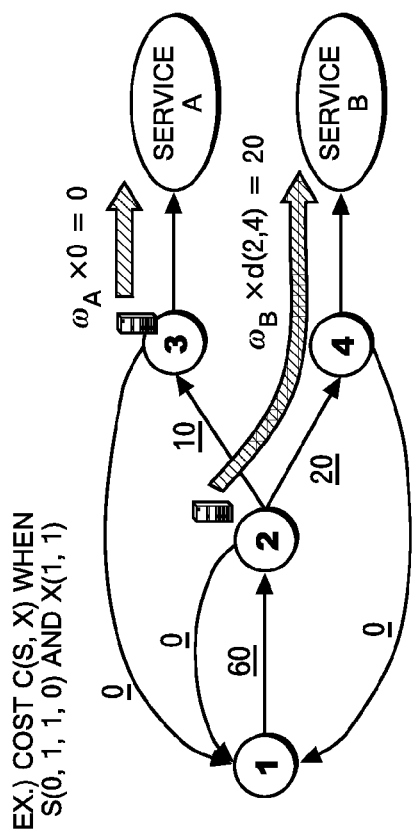
FIG. 22 is a diagram showing an example of calculation of Algorithm 2 in the case where the number of resources is 2.

Calculations of Algorithm 2 are shown in FIG. 21 as an example in the case where the number of resources is 1, and in FIG. 22 as an example in the case where the number of resources is 2.

An illustration in the upper part of FIG. 21 shows a case where, in a state where only one server is allocated to a node 2, i.e., S(1, 1, 0, 0), a request for one server, i.e., X(1, 0) is generated by a service A. The cost c(S, X) at this moment is a value obtained by multiplying a time d(2, 3) by a penalty $\omega_A$ for the service A, when the time d(2, 3) denotes a time required for a transition from the node 2 to a node 3. That is, given $\omega_A$=1 and d(2, 3)=10, C(S, X)=10 follows.

A table in the lower part of FIG. 21 is a summary of results of calculation as described above for all the resource allocation patterns and all the request patterns. Here, generation probabilities of the respective request patterns are both assumed to be 1/2, and for example, costs in S(0, 1, 0, 0) are calculated to be 10 with respect to X(1, 0) from the above-mentioned calculation, and to be 20 with respect to X(0, 1) likewise. Accordingly, an expected value is (1/2)*(10+20) =30/2. By calculating an expected value of all the resource allocation patterns one by one, an allocation pattern minimizing an expected value is found.

FIG. 22 shows calculation in the case where the number of servers is 2. An illustration in the upper part of FIG. 22 shows a case where, in a state where one server and the other server are respectively allocated to the nodes 2 and 3, i.e., S(0, 1, 0, 1), a request for one server, i.e., X(1, 0) is generated by the service A. Cost calculations are the same as in the case with FIG. 21. In this case, however, it is only necessary to deploy a server located at the node 3, just as it is, for the service A. Therefore, a cost at this occasion is 0 regardless of the penalty $\omega_A$.

A table in the lower part of FIG. 22 is a summary of results of the abovementioned calculation for all the resource allocation patterns and all request patterns. Here, the table indicates that, in a case where generation probabilities of the respective three request patterns are equal, an expected value of an allocation pattern of S(0, 2, 0, 0) is a minimum.

Because Algorithm 2 analytically finds a result, it involves a smaller amount of calculation than Algorithm 3. However, in a case where another resource request is generated during execution of a transition for the allocation calculated in 2., a cost can be outrageous sometimes, and a resulting allocation can be slightly different from an optimal one sometimes. Here, when the number of resource in a pool, the number of nodes, and the number of clusters are denoted as n, m, and r, respectively, the number of elements in each of matrices, which respectively compose FIGS. 21 and 22, becomes (combinations of resource requests)×(combinations of resource allocations):

$$_rH_n \times _mH_n$$ [Equation 2]

<Algorithm 3>

In this part, a third algorithm will be described. In Algorithm 3, in the following manner, a provisioning request generated by each service is treated independently from one generated by another service, whereby an amount of calculation is reduced.

1. for each allocation S={all allocation patterns of resources}
   (1) for each service X={all services}

(a) All nodes are sorted in ascending order bases on the distances thereof to the service X.

(b) It is assumed that, when the service X generates a request for n resources, n resources are provisioned in order of the distances starting from the nearest resource to the service. Assuming that a probability of generation of a request for i resources by the service X is Px(i), the nearest resource to the service X is deployed with a probability Px(1), and the second nearest resource thereto is deployed with a probability Px(2).

Likewise, the i-th nearest resource thereto is deployed with a probability Px(i).

Accordingly, an expected value of a cost is expressed as follows.

$$E(S, X) = \omega_X \times \sum_{i=1}^{N} c_i^* P_X(i)$$ [Equation 3]

where if $$\sum_{j=1}^{k-1} n_j + 1 \le i \le \sum_{j=1}^{k} n_j, \text{ then } c_i^* = c_k;$$

$\omega_x$ denotes a penalty for a delay in deployment for a service X; $P_x^{(i)}$ denotes a generation probability of a request for i resources in the service X; $n_j$ denotes the number of resources allocated to the j-th nearest node from the service X, and $c_k$ denotes a weight of a transition to the service X from the k-th nearest node from the service X.

(c) E(S)+=E(S, X) is calculated.

2. An allocation S minimizing E(S) is found. This is the effective allocation S.

3. In order to realize the resource allocation found in 2., it is determined which and how resources should be caused to transition from a current resource allocation. This determination is made by using an existing solving method for graph matching problem, such as a method for minimizing a transition cost, and a method for prioritizing a transition for a service with high priority.

Since an amount of calculation in this Algorithm 3 only becomes (combinations of resource allocation)

$$_mH_n$$ [Equation 4], the amount of calculation is reduced as compared to Algorithm 2. However, depending on topologies of a graph, there can be a case where extremely inefficient allocation is outputted.

Figure 23:
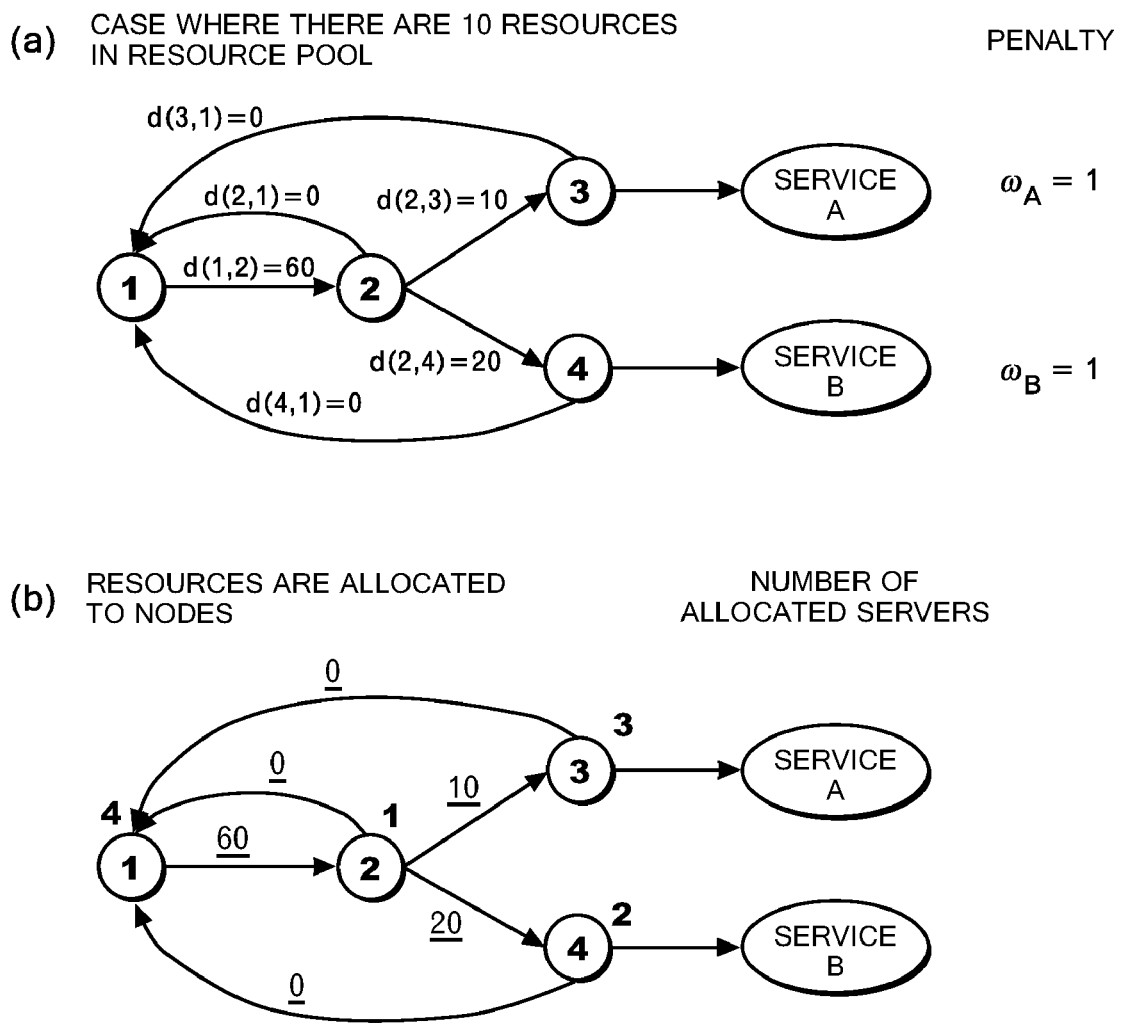
FIG. 23 is a diagram (Part 1) showing a specific example of a procedure in Algorithm 3.

In FIGS. 23 to 26, a specific example of Algorithm 3 is shown. In FIG. 23, first, a consideration is given to a case where, when the number of nodes and the number of services are 4, and 2 respectively, there are 10 resources in a resource pool. Here, penalties for services A and B are both assumed to be 1.

In FIG. 23, the 10 resources are allocated to the respective nodes. Here, it is assumed that 4 resources, 1 resource, 3 resources and 2 resources are allocated to a node 1, a node 2, a node 3, and a node 4, respectively.

Figure 24:
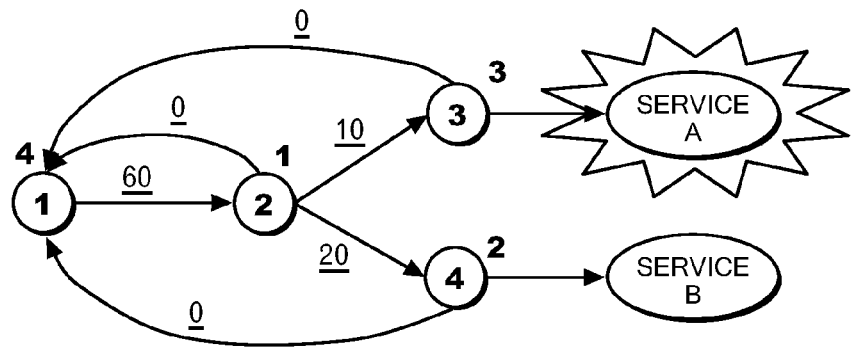
FIG. 24 is a diagram (Part 2) showing the specific example of the procedure in Algorithm 3.
Figure 24:
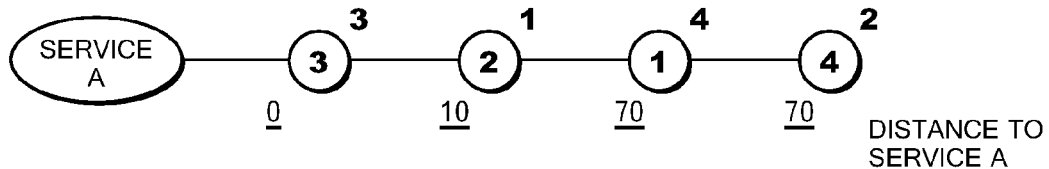

Next, the service A is remarked as shown in FIG. 24, and the nodes are sorted in ascending order based on the distances (weights) to the service A. That is, in this example, because a server located at the node 3 can be deployed, just as it is, for the service A, the distance between the node 3 and the service A is zero. Subsequently, because a time required for transitioning from the node 2 to the node 3 is 10, the distance between the node 3 and the service A also is 10. Likewise, the distance from the node 1 to the service A results in a sum of a time required for a transition from the node 1 to the node 2, and a transition from the node 2 to the node 3, the sum being 60+10=70. Additionally, because a server located at the node 4 has to return to the node 1 to transition to the node 2 and then to the node 3, the distance from the node 4 to the service A results in 60+10=70.

Figure 25:
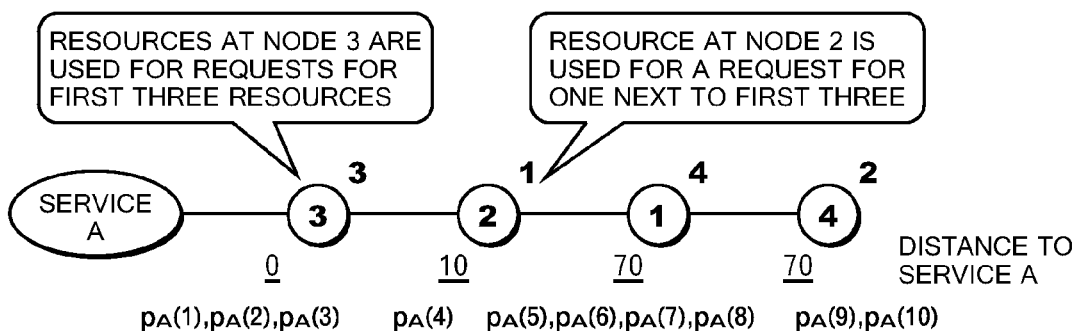
FIG. 25 is a diagram (Part 3) showing the specific example of the procedure in Algorithm 3.

FIG. 25 shows a process of calculating an expected value E (A). Here, the resources at the node 3 are used for requests for up to first three resources, and the resource at the node 2 is used for a request for up to the next one. Likewise, an expected value in the cases where requests for up to 10 resources are generated is calculated by using an equation shown in the drawings from: a probability $P_A(i)$ of generation of a request for i resources to the service A; the distance d(k) of the i-th node nearest to the service A; and a penalty $\omega_A$ for the service A.

Figure 26:
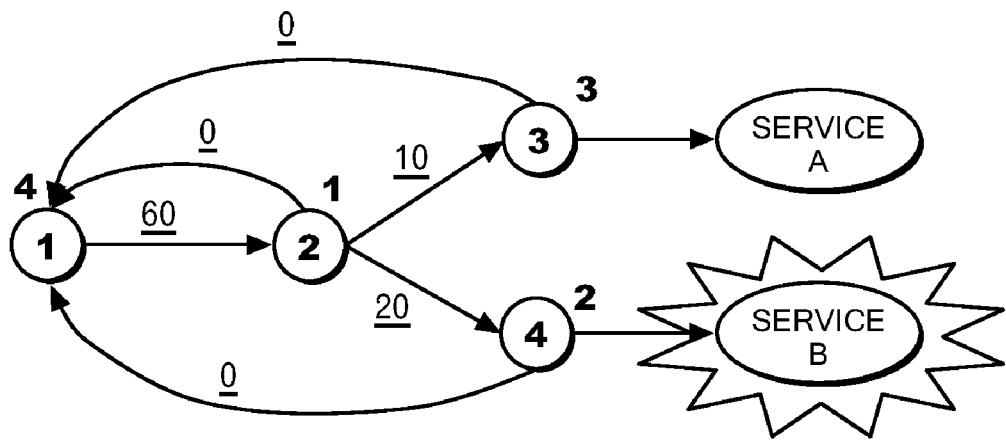
FIG. 26 is a diagram (Part 4) showing the specific example of the procedure in Algorithm 3.
Figure 26:
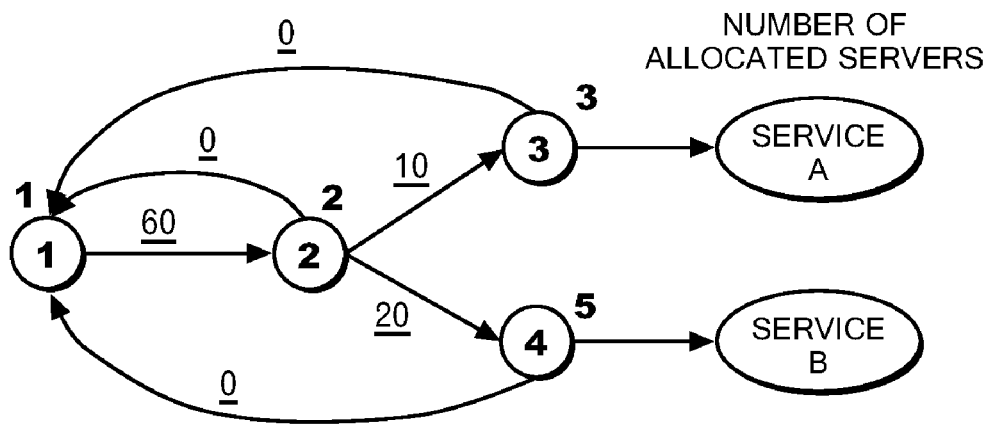

In FIG. 26, E+=E(A) is calculated, and then, remarked services are changed. That is, calculations in the drawings from FIG. 24 to FIG. 25 are similarly performed for the service B replacing the service A.

Furthermore, allocation of resources is changed in FIG. 26, and the process returns to FIG. 23, where the expected value E is recalculated. In this example, the allocation is changed so as to have 1 resource at the node 1, 2 resources at the node 2, 2 resources at node 3, and 5 resources at the node 4. However, this allocation can be an arbitrary pattern. By repeating the above calculations for all the resource allocation patterns, a resource pattern minimizing the expected value E can be found.

EXAMPLE

Hereinbelow, a description will be provided for a system example in the field of on-demand computing by use of a software product named Tivoli (registered trademark) Intelligent Orchestrator (TIO) of IBM Corporation. This example employs a system which can execute provisioning by using TIO as a provisioning manager.

It is assumed that a data center utilizing a plurality of cluster systems for services is managed by TIO. The respective services are used for different purposes and different clients, and therefore have different peaks. If the peaks can be perfectly predicted, it is possible to previously make the system prepared for the peaks by carrying out provisioning in advance. However, it is difficult to perfectly predict the peaks in advance, and additionally, it is impossible to response to a load beyond expectation.

First of all, a directed graph is generated based on an installation procedure (setting operations) which is carried out at the time of provisioning servers to the respective clusters. In generating the directed graph, a node indicates a state where a certain OS or application is installed, and an edge indicates an operational step for installing the OS or application.

A weight of each of the edges represents a processing time of the operational step (for example, a time for an installation and a change of components), and the weight is automatically acquired as an initial value through a test-installation operation. Alternatively, this initial value can be provided by a manger manually. A probability of generation of requests to each of the clusters is determined based on past requests for servers, which have been generated in the each cluster, and is constantly updated as time passes. Additionally, a penalty for a delay in a time of provisioning to a cluster is determined by an SLA of each of the services, whereby a larger penalty is given to a cluster with a higher SLA, and a lower penalty is given to a cluster without the higher SLA.

Based on these data, determination is made on to which nodes currently pooled servers should be allocated, and actual installation operations are executed in order to realize the determined state. When there is a request for a resource (server) from any one of the clusters at this point of time, a server located at a stage whose time required for provisioning is shortest is provisioned.

If the system is provided with a forecasting function for peak times of the respective clusters, more efficient provisioning becomes possible by changing generation probabilities of requests from the respective services.

Although the present invention has been described hereinabove with reference to the embodiment and the example, a technical scope of the present invention is not limited to the scope described in the abovementioned embodiment. Various alterations or improvements can be added to the abovementioned embodiment. It is apparent from the scope of claims that embodiments where such alterations or modifications are incorporated can be included in the technical scope of the present invention.

The method for provisioning explained as the one embodiment of the present invention can be realized by a program which enables a system on a computer, or a computer, to execute functions for the method. Additionally, a storage medium for storing the above program can be an electronic, magnetic, optical, electromagnetic, infrared, or semiconductor system (or, device or apparatus), or a propagation medium. Examples of computer-readable media include a semiconductor, a solid state storage device or and a magnetic tape. Examples of removable computer-readable media include a semiconductor or solid state storage device, a magnetic tape, a removable computer diskette, a random access memory (RAM), a read-only memory (ROM), a rigid magnetic disk and an optical disk. Examples of currently existing optical disks include a compact disc read-only memory (CD-ROM), a compact disc read/write (CD-R/W), and a DVD.

The invention claimed is:

1. A computer-implemented provisioning method for allocating a plurality of resources required by a plurality of services, comprising the steps of:
   staging, by a computing device, so as to provide at least one stage, as an intermediate state, in the process of provisioning, in a resource pool shared by the plurality of services;
   allocating, by said computing device, a state of at least one of the plurality of resources to at least one of the stages as an initial state provided in advance; and
   calculating, by said computing device, a predetermined cost by using a predetermined algorithm based on a setting operation time required for causing a state of each of the allocated plurality of resources to transition to another stage; and
   optimally allocating, by said computing device, all the plurality of resources to the respective stages in order to minimize the predetermined cost.

2. The method for provisioning according to the claim 1, wherein, in the staging step, a directed graph is generated, by said computing device, which has each of the stages as a node, and each of the setting operation times as a weight of the edge.

3. The method for provisioning according to the claim 2, wherein the predetermined cost is determined, by said computing device, by a product of a time required for completing deployment of resources for a certain service, and a penalty for a delay of the deployment for the service, the resource deployment caused by resource request generation from the service.

4. The method for provisioning according to the claim 3, wherein the predetermined algorithm finds, by said computing device, a pattern of allocating all the resources to stages by simulation based on a resource request generation distribution of each of the services, the allocation pattern minimizing a predetermined cost and being a pattern any one of one and two moves ahead of a current allocation pattern of all the resources.

5. The method for provisioning according to the claim 3, wherein:
   the predetermined algorithm calculates, by said computing device, an expected value E(S) of each pattern of allocating all the resources to stages by using $$E(S) = \sum_X p(X) \times c(S, X),$$

where $$c(S, X) = \sum_{i,j} \omega_x \times d(i, j);$$

P(X) denotes a generation probability of a request X;
$\omega_x$ denotes a penalty for a delay in deployment for a request X; and
d(i, j) denotes a time required for a transition from node i, where a resource is currently located, to node j corresponding to the request X;
the algorithm finds a pattern of allocating all the resources to stages, the allocation pattern minimizing the expected value E(S); and
the algorithm determines a transition from a current resource allocation to the resource allocation of the allocation pattern by using a graph-matching problem.

6. The method for provisioning according to the claim 3, wherein:
   the predetermined algorithm calculates, by said computing device, E(S, X) found by the following equation for each pattern of allocating all the resources to stages and for each of all the services:

$$E(S, X) = \omega_X \times \sum_{i=1}^{N} c_i^* P_X(i)$$

where if $$\sum_{j=1}^{k-1} n_j + 1 \le i \le \sum_{j=1}^{k} n_j, \text{ then } c_i^* = c_k;$$

$\omega_x$ denotes a penalty for a delay in deployment for a service X;
$P_x^{(i)}$ denotes a generation probability of a request for i resources to the service X;

$n_j$ denotes the number of resources allocated to the j-th nearest node from the service X; and $c_k$ denotes a weight of a transition to the service X from the k-th nearest node to the service X;

the algorithm further calculates, by said computing device, an expected value E(S) which is a sum total of the E(S, X) for all the services X, and finds a pattern of allocating all the resources to stages, the allocation pattern minimizing an E(S); and the algorithm determines, by said computing device, a transition from a current resource allocation to a resource allocation of the allocation pattern by using a graph-matching problem.

7. The method for provisioning according to claim 4, wherein the simulation causes, by said computing device, a resource request based on a particular probability distribution.

8. A non-transitory computer storage medium readable by a computer tangibly embodying a program of instructions executable by said computer for performing method of provisioning to allocate a plurality of resources required by a plurality of services, said method comprising:

staging so as to provide at least one stage, as an intermediate state, in the process of provisioning, in a resource pool shared by the plurality of services;

allocating a state of at least one of the plurality of resources to at least one of the stages as an initial state provided in advance;

calculating a predetermined cost by using a predetermined algorithm based on a setting operation time required for causing a state of each of the allocated plurality of resources to transition to another of the stages; and optimally allocating all the plurality of resources to the respective stages in order to minimize the predetermined cost.

9. The method for provisioning according to the claim 8, wherein, in the staging step, a directed graph is generated which has each of the stages as a node, and each of the setting operation times as a weight of the edge.

10. The method for provisioning according to the claim 9, wherein the predetermined cost is determined by a product of a time required for completing deployment of resources for a certain service, and a penalty for a delay of the deployment for the service, the resource deployment caused by resource request generation from the service.

11. The method for provisioning according to the claim 10, wherein the predetermined algorithm finds a pattern of allocating all the resources to stages by simulation based on a resource request generation distribution of each of the services, the allocation pattern minimizing a predetermined cost and being a pattern any one of one and two moves ahead of a current allocation pattern of all the resources.

12. The method for provisioning according to the claim 10, wherein:

the predetermined algorithm calculates an expected value E(S) of each pattern of allocating all the resources to stages by using $$E(S) = \sum_x p(X) \times c(S, X),$$

where $c(S, X) = \sum_{i,j} \omega_x \times d(i, j);$

P(X) denotes a generation probability of a request X;

$\omega_x$ denotes a penalty for a delay in deployment for a request X; and d(i, j) denotes a time required for a transition from node i, where a resource is currently located, to node j corresponding to the request X;

the algorithm finds a pattern of allocating all the resources to stages, the allocation pattern minimizing the expected value E(S); and the algorithm determines a transition from a current resource allocation to the resource allocation of the allocation pattern by using a graph-matching problem.

13. The method for provisioning according to the claim 10, wherein:

the predetermined algorithm calculates E(S, X) found by the following equation for each pattern of allocating all the resources to stages and for each of all the services:

$$E(S, X) = \omega_X \times \sum_{i=1}^{N} c_i^* P_X(i)$$

where if $\sum_{j=1}^{k-1} n_j + 1 \le i \le \sum_{j=1}^{k} n_j,$ then $c_i^* = c_k;$ $\omega_x$ denotes a penalty for a delay in deployment for a service X;

$P_x^{(i)}$ denotes a generation probability of a request for i resources to the service X;

$n_j$ denotes the number of resources allocated to the j-th nearest node from the service X; and $c_k$ denotes a weight of a transition to the service X from the k-th nearest node to the service X;

the algorithm further calculates an expected value E(S) which is a sum total of the E(S, X) for all the services X, and finds a pattern of allocating all the resources to stages, the allocation pattern minimizing an E(S); and the algorithm determines a transition from a current resource allocation to a resource allocation of the allocation pattern by using a graph-matching problem.

14. The method for provisioning according to claim 11, wherein the simulation causes a resource request based on a particular probability distribution.

* * * * *